United States Patent
Matsuo et al.

(10) Patent No.: US 9,494,204 B2
(45) Date of Patent: Nov. 15, 2016

(54) CONTROLLER FOR VEHICLE TRANSMISSION

(71) Applicant: TOYOTA JIDOSHA KABUSHIKI KAISHA, Toyota-shi, Aichi-ken (JP)

(72) Inventors: Kenji Matsuo, Toyota (JP); Hirofumi Nakada, Toyota (JP);
(Continued)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/401,431

(22) PCT Filed: Apr. 16, 2013

(86) PCT No.: PCT/JP2013/061249
§ 371 (c)(1),
(2) Date: Nov. 14, 2014

(87) PCT Pub. No.: WO2014/170950
PCT Pub. Date: Oct. 23, 2014

(65) Prior Publication Data
US 2016/0025161 A1 Jan. 28, 2016

(51) Int. Cl.
*F16H 37/02* (2006.01)
*F16H 61/66* (2006.01)
(Continued)

(52) U.S. Cl.
CPC .............. *F16D 48/08* (2013.01); *F16D 21/08* (2013.01); *F16D 27/14* (2013.01); *F16D 48/062* (2013.01);
(Continued)

(58) Field of Classification Search
CPC .............. F16H 37/021; F16H 2037/026; F16H 2061/6618
See application file for complete search history.

(56) References Cited

U.S. PATENT DOCUMENTS

| 4,433,594 A | * | 2/1984 | Smirl | F16D 13/64 192/113.34 |
| 5,088,352 A | * | 2/1992 | Ishimaru | F16H 37/021 474/28 |
| 2002/0086764 A1 | * | 7/2002 | Ooyama | F16H 61/6648 475/214 |

FOREIGN PATENT DOCUMENTS

| JP | 62-45455 | 3/1987 |
| JP | 3-234960 | 10/1991 |

(Continued)

*Primary Examiner* — Tisha Lewis
(74) *Attorney, Agent, or Firm* — Finnegan, Henderson, Farabow, Garrett & Dunner, LLP

(57) ABSTRACT

A controller for a vehicle transmission in which a continuously variable transmission mechanism able to continuously change its speed ratio and a transmission mechanism having a constant speed ratio are provided in parallel between an input shaft and an output shaft. The transmission includes a friction engagement mechanism and an intermeshing engagement mechanism, the intermeshing engagement mechanism being arranged in series with the friction engagement mechanism, the intermeshing engagement mechanism setting the transmission mechanism to a state where torque is transmittable between the input and output shaft, in changing to a state where the intermeshing engagement mechanism is engaged and the transmission mechanism is able to transmit torque to the output shaft, a torque capacity of the friction engagement mechanism is configured to be increased to a torque capacity to such extent that the transmission mechanism rotates without a delay of start of engagement of the intermeshing engagement mechanism.

7 Claims, 16 Drawing Sheets

(72) Inventors: Michio Yoshida, Susono (JP); Daisuke Inoue, Toyota (JP); Atsushi Ayabe, Toyota (JP); Motonori Kimura, Toyota (JP); Shuhei Ishikawa, Toyota (JP); Akira Hino, Toyota (JP); Hiroki Kondo, Miyoshi (JP)

(51) Int. Cl.
*F16D 48/08* (2006.01)
*F16D 48/06* (2006.01)
*F16D 21/08* (2006.01)
*F16D 27/14* (2006.01)

(52) U.S. Cl.
CPC ..... *F16H 37/022* (2013.01); *F16D 2500/1045* (2013.01); *F16D 2500/1088* (2013.01); *F16D 2500/3026* (2013.01); *F16D 2500/30803* (2013.01); *F16D 2500/30816* (2013.01); *F16D 2500/3108* (2013.01); *F16D 2500/3144* (2013.01); *F16D 2500/31466* (2013.01); *F16D 2500/50287* (2013.01); *F16D 2500/525* (2013.01); *F16D 2500/7041* (2013.01); *F16H 2037/026* (2013.01)

(56) References Cited

FOREIGN PATENT DOCUMENTS

| | | |
|---|---|---|
| JP | 2001-56045 | 2/2001 |
| JP | 2004-270891 | 9/2004 |
| JP | 2009-275760 | 11/2009 |

\* cited by examiner

FIG. 8

|  | C1 | C2 | D1 | B |
|---|---|---|---|---|
| START MOVING | ON | OFF | ON | OFF |
| FORWARD TRAVELING | OFF | ON | ON OR OFF | OFF |
| REVERSE TRAVELING | OFF | OFF | ON | ON |
| NEUTRAL | OFF | OFF | ON OR OFF | OFF |

CONTROLLER FOR VEHICLE TRANSMISSION

CROSS REFERENCE TO RELATED PATENT APPLICATION

This application is a national phase of International Application No. PCT/JP2013/061249, filed on Apr. 16, 2013, which is incorporated herein in its entirety by reference.

TECHNICAL FIELD

The invention relates to an apparatus for controlling a transmission that is mounted on a vehicle and, more particularly, to a controller for a transmission in which at least two power transmission paths are provided between a driving force source, such as an engine, and an output member that outputs torque to a wheel.

BACKGROUND ART

As a transmission for a vehicle, there are known; a type of transmission that carries out a shift by selecting from among a plurality of power transmission paths having predetermined speed ratios, and a transmission having a mechanism that is able to continuously change its speed ratio. A typical example of the former transmission is a stepped gear transmission, and a typical example of the latter transmission having the mechanism is a belt-type or toroidal-type continuously variable transmission. A gear transmission mechanism and a continuously variable transmission mechanism each are able to constitute a transmission alone; however, a combination of these mechanisms is able to set further various speed ratios and is also able to constitute a compact transmission.

As one example of that, Japanese Utility Model Application Publication No. 62-45455 (JP 62-45455 U) describes an automatic transmission in which a belt-type continuously variable transmission and a gear train are arranged in parallel with each other between an input shaft and an output shaft. The belt-type continuously variable transmission includes a primary pulley and a secondary pulley around which a belt is wound. The input shaft is coupled to the primary pulley via a gear. The secondary pulley is coupled to an intermediate shaft via a clutch. On the other hand, in the gear train, a gear formed on a drum of the clutch serves as a drive gear, the drum is selectively coupled to the input shaft, and the drive gear is in mesh with a forward gear connected to the intermediate shaft. A reverse gear is rotatably connected to the intermediate shaft. A switching sleeve is arranged between the reverse gear and the forward gear. The switching sleeve is an intermeshing engagement mechanism. When the switching sleeve moves in the axial direction to mesh with the forward gear, the switching sleeve couples the forward gear to the intermediate shaft. When the switching sleeve moves toward a side opposite to this to mesh with the reverse gear, the switching sleeve couples the reverse gear to the intermediate shaft. The reverse gear is coupled to a reverse counter gear via an idle gear. The reverse counter gear is connected to the output shaft.

The transmission described in JP 62-45455 U includes not only the belt-type continuously variable transmission but also the gear transmission mechanism, so the transmission carries out a shift by engaging or releasing the clutch or the switching sleeve. A shift for operating an engagement mechanism, such as a clutch, is general in a stepped transmission; however, when the engagement mechanism is operated, there occurs fluctuations in rotation speed and torque, so it may be required to execute control for a shift shock or improvement in durability. For example, an apparatus described in Japanese Patent Application Publication No. 2004-270891 (JP 2004-270891 A) is configured to execute control for reducing a rotation speed difference in engaging a synchronization mechanism in order to improve the durability of the synchronization mechanism in a stepped transmission. The configuration of the apparatus described in JP 2004-270891 A will be simply described. A pair of drive gears are rotatably connected to a sun gear shaft of a planetary gear train to which torque is transmitted from an engine via a plurality of clutches. A pair of driven gears respectively in mesh with the corresponding drive gears are connected to an output shaft. A dog clutch is provided between those drive gears, one of the drive gears is configured to be selectively coupled to the sun gear shaft by the dog clutch. Another pair of drive gears are connected to a carrier shaft integrated with a carrier of the planetary gear train. Another pair of driven gears respectively in mesh with the corresponding drive gears are rotatably connected to the output shaft. Another dog clutch is arranged between these driven gears. One of the driven gears is configured to be selectively coupled to the output shaft by the dog clutch. Thus, the transmission described in JP 2004-270891 A includes the four gear pairs as gear pairs that transmit torque to the output shaft, and is configured to select the gear pair that transmits torque with the above-described two dog clutches. In the case of a shift that changes a rotating element to which torque is transmitted from the engine among rotating elements of the planetary gear train and that changes the engaged/released states of the dog clutches, a so-called tie-up state is temporarily established. Thus, a rotation speed difference in the synchronization mechanism that should be engaged is reduced. In the tie-up state, the dog clutch that should be engaged after the shift is set to the released state and then torque is transmitted from the engine to two rotating elements of the planetary gear train in this state.

Incidentally, the switching sleeve described in JP 62-45455 U and the dog clutches described in JP 2004-270891 A each are a mechanism that transmits torque by meshing teeth with each other. Therefore, a normal meshing state is a state where the drive-side teeth are shifted by a half pitch from the driven-side teeth. In other words, when the teeth are shifted by a half pitch in this way in a non-engaged state (released state), those teeth are allowed to mesh with each other when the teeth are brought close to each other. On the contrary, when there is no shift between the phases of the teeth in the non-engaged state (released state), if the teeth are brought close to each other in order to set the switching sleeve or one of the dog clutches to the engaged state, the teeth collide with each other, with the result that the teeth cannot be meshed with each other.

Thus, for example, in the transmission described in JP 62-45455 U, if a speed ratio of the gear train is set so as to be higher than a maximum speed ratio of the belt-type continuously variable transmission and torque is configured to be transmitted to the output shaft by the gear train at the time when the vehicle starts moving, when the phase of the switching sleeve coincides with the phase of the teeth of the forward gear or reverse gear in a vehicle stopped state, the teeth of the switching sleeve contact the gear-side teeth, with the result that the forward gear or the reverse gear is not coupled to the intermediate shaft. If the gear train is coupled to the input shaft while the teeth contact with each other, the forward gear rotates to cause a shift between the phases of the teeth, so it is possible to mesh the teeth with each other.

However, torque of the drive wheel steeply increases in the vehicle stopped state, so there is a possibility that a shock occurs.

In the transmission described in JP 2004-270891 A, a rotation speed difference in the dog clutch placed in a standby state is eliminated in a short time, so the rotation speed difference that is absorbed by the synchronization mechanism decreases, with the result that it is possible to improve the durability. However, because the synchronization mechanism is a mechanism that exercises the function of synchronizing the rotation speeds of members to be coupled while at least one of the members is rotating, the synchronization mechanism does not exercise the synchronization function for meshing when rotation of both members is stopped. The apparatus described in JP 2004-270891 A is an apparatus for reducing the rotation speed difference in the synchronization mechanism in the case of carrying out a shift while the vehicle is traveling, and cannot be directly applied to control for reliably and smoothly meshing the teeth of the engagement mechanism in a state where the engagement mechanism is not rotating, such as a state where the vehicle is stopped.

SUMMARY OF THE INVENTION

The invention is made by focusing on the above-described technical problems, and it is an object of the invention to provide a controller that is able to reliably engage a dog clutch without generating an excessive shock. At least two power transmission paths are provided between an input member and an output member. The dog clutch sets one of the at least two power transmission paths to a state where it is possible to transmit torque to the output member.

In order to achieve the object, the invention provides a controller for a vehicle. The vehicle includes a continuously variable transmission mechanism, a transmission mechanism, a friction engagement mechanism, an intermeshing engagement mechanism and a shift mechanism. The continuously variable transmission mechanism and the transmission mechanism are provided in parallel with each other between an input member to which torque is transmitted from a driving force source and an output member that outputs torque to a drive wheel. The friction engagement mechanism transmits torque from the input member to the transmission mechanism. The intermeshing engagement mechanism is arranged on a downstream side of the friction engagement mechanism in a direction in which torque is transmitted from the input member toward the output member. The intermeshing engagement mechanism sets the transmission mechanism to a state where torque is transmitted between the input member and the output member. The shift mechanism selects between a neutral state where torque output from the driving force source is not transmitted to the drive wheel and a drive state where a predetermined speed ration is set. The controller includes an electronic control unit. The electronic control unit is configured to, in changing from a state where both the friction engagement mechanism and the intermeshing engagement mechanism are released and the transmission mechanism is not able to transmit torque to a state where the intermeshing engagement mechanism is engaged and the transmission mechanism transmits torque to the output member, start engaging the intermeshing engagement mechanism after a torque capacity of the friction engagement mechanism is increased to a torque capacity that rotates the transmission mechanism. The electronic control unit is configured to carry out an increase in the torque capacity of the friction engagement mechanism by increasing the torque capacity of the friction engagement mechanism for establishing the drive state as a result of selection of the drive state by the shift mechanism.

In the invention, the driving force source may include an internal combustion engine that is cranked to start up, and control for changing from a state where both the friction engagement mechanism and the intermeshing engagement mechanism are released to a state where the intermeshing engagement mechanism is engaged and the transmission mechanism is able to transmit torque to the output member may be configured to be executed at the time when the internal combustion engine is cranked to start up.

The friction engagement mechanism in the invention may include a mechanism that includes a drive-side member and a driven-side member and is able to transmit torque in a state where these drive-side member and driven-side member are in sliding contact with each other, and the torque capacity that rotates the transmission mechanism, may include a torque capacity that is set by bringing the drive-side member and the driven-side member into sliding contact with each other.

Alternatively, the friction engagement mechanism in the invention may include a mechanism of which a torque capacity increases with a hydraulic pressure that is supplied to the mechanism, and a hydraulic pressure for setting the torque capacity, to such extent that the transmission mechanism rotates, may be set on the basis of at least one of a rotation speed of the transmission mechanism and an oil temperature.

In the invention, after control for engaging each of the friction engagement mechanism and the intermeshing engagement mechanism is started, when engagement of the intermeshing engagement mechanism is not detected, control for engaging the intermeshing engagement mechanism may be configured to be executed again.

The continuously variable transmission mechanism in the invention may include a belt and a belt-type continuously variable transmission mechanism on which the belt is wound and in which a winding radius of the belt continuously changes by changing the width of a groove, and the transmission mechanism may include a gear mechanism having a speed ratio higher than a maximum speed ratio of the belt-type continuously variable transmission mechanism or a speed ratio lower than a minimum speed ratio of the belt-type continuously variable transmission mechanism.

The transmission mechanism in the invention may include a forward/reverse switching mechanism that is switched between a forward traveling state where, when torque is transmitted from the input member to the output member, the output member is caused to rotate in the same direction as the input member and a reverse traveling state where, when torque is transmitted from the input member to the output member, the output member is caused to rotate in a direction opposite to the input member.

In the invention, a fluid transmission mechanism may be provided between the driving force source and the input member.

According to the invention, when changing from a state where the friction engagement mechanism arranged at the input side of the transmission mechanism and the intermeshing engagement mechanism provided at the output side are in the released state and the transmission mechanism is not transmitting torque to a state where the intermeshing engagement mechanism is engaged and the transmission mechanism is able to transmit torque to the output member, without a delay from a change of the intermeshing engagement mechanism into the engaged state, the friction engagement mechanism is controlled to have a certain torque capacity, and the transmission mechanism is rotated. Thus, even when the output member to which the intermeshing engagement mechanism is connected is stopped, a state where the phases of the meshing teeth coincide with each other to bring the meshing teeth into collision with each other is eliminated, so it is possible to reliably and smoothly change the intermeshing engagement mechanism to the engaged state. Torque that rotates the transmission mechanism in this way is transmitted by the friction engagement mechanism, the torque may be set to such a small torque that the transmission mechanism rotates, and, when a load larger than the torque capacity is applied, the friction engagement mechanism slips, and a further large torque is not applied to the transmission mechanism or the output shaft. Therefore, even when the intermeshing engagement mechanism is engaged and torque is transmitted from the input shaft to the output member via the transmission mechanism, it is possible to prevent or suppress an excessive shock or abrasion. According to the invention, when the friction engagement mechanism is engaged as a result of selection of the drive state, the intermeshing engagement mechanism is controlled to the engaged state at the same time or immediately after engagement control over the friction engagement mechanism. Thus, engagement control over the friction engagement mechanism for causing the vehicle to start moving is also used as engagement control for engaging the intermeshing engagement mechanism, so it is possible to avoid or suppress a delay start of the vehicle.

Control for engaging the intermeshing engagement mechanism as described above may be executed when the internal combustion engine is cranked to start up in a state where the vehicle is stopped and the internal combustion engine that serves as a driving force source is stopped. In this case, it is possible to couple the transmission mechanism to the output member during cranking or at the time of completion of startup control over the internal combustion engine, so it is possible to eliminate or suppress a delay of start control over the vehicle for transmitting torque to the drive wheel via the transmission mechanism.

When the friction engagement mechanism is a mechanism that changes its torque capacity by hydraulic pressure, hydraulic pressure that is supplied to the friction engagement mechanism in engaging the intermeshing engagement mechanism is set on the basis of the rotation speed of the transmission mechanism or the oil temperature. Thus, it is possible to accurately set such a small torque capacity that it is possible to rotate the transmission mechanism, and it is possible to prevent or suppress an excessive shock or an excessive slip in the friction engagement mechanism.

On the other hand, even when engagement control over the intermeshing engagement mechanism accompanied by control for increasing the torque capacity of the friction engagement mechanism is executed, but when engagement of the intermeshing engagement mechanism is not detected, control for engaging the intermeshing engagement mechanism is repeated. That is, control for operating the intermeshing engagement mechanism in the engaging direction is repeated, and, therefore, contact between the meshing teeth is once cancelled and then the intermeshing engagement mechanism is operated in the engaging direction again, so it is possible to increase the possibility that the phases of the meshing teeth shift from each other and meshing is established.

BRIEF DESCRIPTION OF THE DRAWINGS

FIG. 8 is a table that collectively shows engaged and released states of engagement mechanisms and brake mechanism for setting each of a start moving state, a forward traveling state, a reverse traveling state and a neutral state.

MODES FOR CARRYING OUT THE INVENTION

A vehicle transmission that is employed as an object in the invention is configured to be able to transmit torque, output from a driving force source, to a drive wheel via at least two paths. The driving force source may be formed of an internal combustion engine, such as a gasoline engine or a diesel engine. In the invention, an electric motor, a hybrid mechanism that combines an electric motor with an internal combustion engine, or the like, may be employed as the driving force source. Each of the at least two paths that transmit torque between an input member to which torque is transmitted from the driving force source and an output member that outputs torque to the drive wheel may be formed of a mechanism that is conventionally widely known as a mechanism for transmitting torque. For example, one of the paths may be formed of a belt-type or toroidal-type continuously variable transmission, and the other one of the paths may be formed of a mechanism having a constant speed ratio, such as a gear train and a chain drive mechanism. These paths that transmit torque between the input member and the output member are respectively configured to set different speed ratios. Therefore, it is required to select the path that transmits torque in order for the vehicle to travel. For this purpose, a plurality of engagement mechanisms are provided. The engagement mechanisms for the above-described mechanism having a constant speed ratio include a friction engagement mechanism for coupling the mechanism to the input member and an intermeshing engagement mechanism for coupling the mechanism to the output member.

Figure 7:
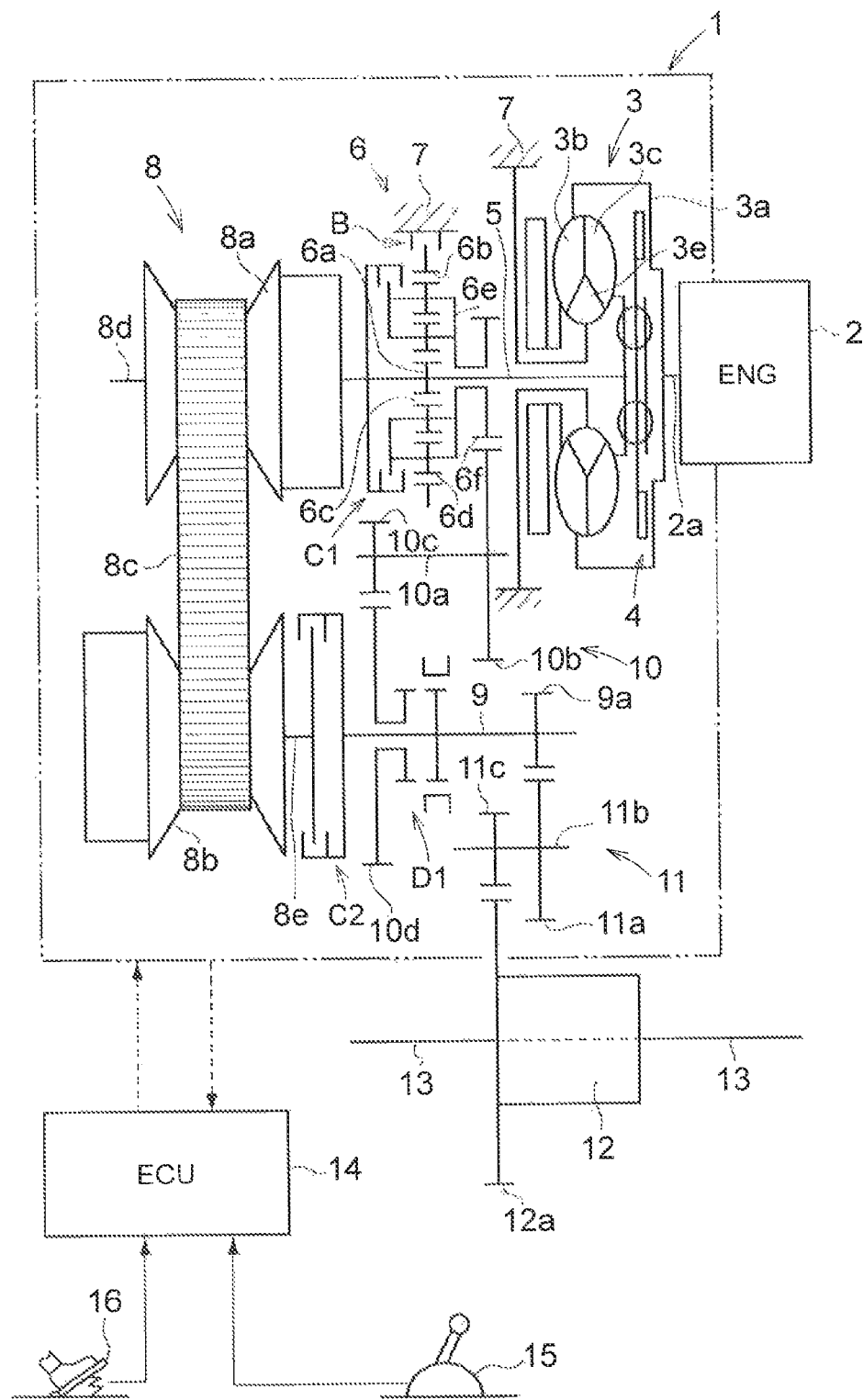
FIG. 7 is a schematic view that shows an example of a transmission that may be employed as an object in the invention.

FIG. 7 shows an example of a vehicle transmission 1 that may be employed as the object in the invention. The transmission 1 is used by being coupled to an output side of an internal combustion engine (hereinafter, referred to as engine) 2 that serves as the driving force source. Specifically, a torque converter 3 equipped with a lockup clutch is coupled to an output shaft 2a of the engine 2. The torque converter 3 serves as a fluid coupling. The torque converter 3 has a conventionally known configuration. In the torque converter 3, a turbine runner 3c is arranged opposite a pump impeller 3b integrated with a front cover 3a. A stator 3e held via a one-way clutch is arranged between these pump impeller 3b and the turbine runner 3c. In addition, a lockup clutch 4 that rotates integrally with the turbine runner 3c is arranged opposite the inner face of the front cover 3a. In response to a pressure difference between both sides of the lockup clutch 4, the lockup clutch 4 is configured to be set to an engaged state or a released state. In the engaged state, the lockup clutch 4 contacts the inner face of the front cover 3a and transmits torque. In the released state, the lockup clutch 4 moves away from the inner face of the front cover 3a and interrupts transmission of torque.

An input shaft 5 of the transmission 1 is coupled to the turbine runner 3c in the above-described torque converter 3. A forward/reverse switching mechanism 6 is arranged along the same axis as the axis of the input shaft 5. The forward/reverse switching mechanism 6 is a mechanism for switching between a forward traveling state and a reverse traveling state. In the forward traveling state, torque output from the engine 2 is transmitted to a counter shaft 10a (described later) without changing its rotational direction. In the reverse traveling state, torque output from the engine 2 is transmitted to the counter shaft 10a while inverting its rotational direction.

In the example shown in FIG. 7, the above-described forward/reverse switching mechanism 6 is formed of a so-called differential mechanism in which three rotating elements carry out differential action with one another. Specifically, the forward/reverse switching mechanism 6 is formed of a double-pinion-type planetary gear train. The double-pinion-type planetary gear train that constitutes the forward/reverse switching mechanism 6 includes a sun gear 6a, a ring gear 6b, first pinion gears 6c, second pinion gears 6d, and a carrier 6e. The sun gear 6a is an external gear. The ring gear 6b is an internal gear and is arranged concentrically with the sun gear 6a. The first pinion gears 6c are in mesh with the sun gear 6a. Each of the second pinion gears 6d is in mesh with a corresponding one of the first pinion gears 6c and the ring gear 6b. The carrier 6e holds the first pinion gears 6c and the second pinion gears 6d such that the first pinion gears 6c and the second pinion gears 6d are rotatable on their axes and revolvable. The input shaft 5 is coupled to the above-described sun gear 6a. Thus, the sun gear 6a serves as an input element. A brake mechanism B is provided. The brake mechanism B selectively stops rotation of the ring gear 6b. Thus, the ring gear 6b serves as a reaction element. The brake mechanism B is provided between the ring gear 6b and a fixed portion 7, such as a casing. The brake mechanism B may be formed of, for example, a friction brake, such as a multi-disc brake, or an intermeshing brake.

The carrier 6e serves as an output element. A first clutch mechanism C1 is provided between the carrier 6e and the sun gear 6a or input shaft 5. The first clutch mechanism C1 is used to integrally rotate the whole planetary gear train by coupling these carrier 6e and sun gear 6a to each other. The first clutch mechanism C1 is to selectively transmit torque of the input shaft 5 to a gear train 10 (described later). The first clutch mechanism C1 is a friction engagement mechanism that is able to transmit torque by friction force and continuously change its torque capacity. The first clutch mechanism C1 is, for example, formed of a multi-disc clutch that brings clutch discs to frictionally contact with clutch plates by hydraulic pressure, and is a start clutch at the time when the vehicle travels in a forward direction.

A belt-type continuously variable transmission mechanism (CVT) 8 is arranged at an end (left side in the example shown in FIG. 7) of the input shaft 5 across from the engine 2 side. The CVT 8 has a similar configuration to the conventionally known configuration. That is, the CVT 8 includes a primary pulley 8a, a secondary pulley 8b and a belt 8c. The primary pulley 8a is a drive-side rotating member. The secondary pulley 8b is a driven-side rotating member. The belt 8c is wound around these primary pulley 8a and secondary pulley 8b. Each of the primary pulley 8a and the secondary pulley 8b is configured such that a winding radius of the belt 8c increases or decreases with a change in the width of a groove in which the belt 8c is wound. That is, the primary pulley 8a and the secondary pulley 8b are configured to change a speed ratio by changing the width of each of the grooves in which the belt 8c is wound.

The primary pulley 8a is arranged along the same axis as the axis of the input shaft 5 on a side across the above-described forward/reverse switching mechanism 6 from the engine 2. A primary shaft 8d integrated with the primary pulley 8a is coupled to the sun gear 6a that is the input element in the forward/reverse switching mechanism 6. The secondary pulley 8b is arranged such that the rotation central axis of the secondary pulley 8b is parallel to the rotation central axis of the above-described primary pulley 8a. A secondary shaft 8e is provided along the rotation central axis of the secondary pulley 8b. The output shaft 9 is arranged along the same axis as the axis of the secondary shaft 8e. Thus, the output shaft 9 is parallel to the above-described input shaft 5.

A second clutch mechanism C2 is provided between the output shaft 9 and the secondary shaft 8e. The second clutch mechanism C2 selectively couples these output shaft 9 and secondary shaft 8e to each other. The second clutch mechanism C2 just needs to be able to selectively transmit or interrupt torque between the secondary pulley 8b and the output shaft 9. Thus, the second clutch mechanism C2 may be any one of a friction clutch and an intermeshing clutch. However, the second clutch mechanism C2 is preferably formed of a friction clutch of which a torque capacity gradually increases or decreases with engagement force.

The transmission 1 that is employed as a controlled object in the invention includes the gear train 10 arranged in parallel with the above-described CVT 8. The gear train 10 is a gear transmission mechanism formed of a plurality of gears and having a predetermined constant speed ratio. The gear train 10 is configured as a transmission mechanism having a set speed ratio different from that of the CVT 8. Specifically, the gear train 10 is configured as a speed reduction mechanism or a speed increasing mechanism. The speed reduction mechanism sets a speed ratio higher than the maximum speed ratio that can be set by the CVT 8. The speed increasing mechanism sets a speed ratio lower than the minimum speed ratio that can be set by the CVT 8. In the example shown in FIG. 7, the gear train 10 is configured as the speed reduction mechanism.

Thus, the above-described transmission 1 includes two transmission paths. The two transmission paths include a transmission path including the above-described CVT 8, that is, a transmission path from the input shaft 5 via the primary pulley 8a and secondary pulley 8b of the CVT 8 to the output shaft 5, and a transmission path formed of the above-described gear train 10, that is, a transmission path from the input shaft 9 to the output shaft 9 via the gear train 10.

More specifically, the gear train 10 includes the counter shaft 10a arranged in parallel with each of the input shaft 5 and the output shaft 9. A counter driven gear 10b is connected to one end (right side in the example shown in FIG. 7) of the counter shaft 10a so as to integrally rotate with the counter shaft 10a. A drive gear 6f is in mesh with the counter driven gear 10b. The drive gear 6f integrally rotates with the carrier 6e of the above-described forward/reverse switching mechanism 6. The counter driven gear 10b is a gear having a larger diameter than the drive gear 6f. Therefore, torque is transmitted so as to be amplified in a direction from the drive gear 6f to the counter driven gear 10b.

A counter drive gear 10c is connected to the other end (left side in the example shown in FIG. 7) of the counter shaft 10a so as to integrally rotate with the counter shaft 10a. The counter drive gear 10c is a gear having a smaller diameter than the above-described counter driven gear 10b. A driven gear 10d is in mesh with the counter drive gear 10c. The driven gear 10d is arranged so as to be able to relatively rotate with respect to the output shaft 9 on the above-described output shaft 9. The driven gear 10d has a larger diameter than the counter drive gear 10c. Therefore, torque is transmitted so as to be amplified in a direction from the driven gear 10d to the counter drive gear 10c. Thus, the speed ratio (gear ratio) of the gear train 10 is a speed ratio obtained by multiplying the speed ratio between the drive gear 6f and the counter driven gear 10b by the speed ratio between the counter drive gear 10c and the driven gear 10d. In the example shown in FIG. 7, the speed ratio of the gear train 10 is configured so as to be higher than the maximum speed ratio of the CVT 8.

In addition, an intermeshing engagement mechanism D1 is provided. The intermeshing engagement mechanism D1 is used to selectively set a state where the driven gear 10d is coupled to the output shaft 9 so that power is transmittable or a state where transmission of power is interrupted between the driven gear 10d and the output shaft 9. That is, the intermeshing engagement mechanism D1 is arranged in series with the first clutch mechanism C1 on a downstream side in a torque transmission direction with respect to the above-described first clutch mechanism C1. When the intermeshing engagement mechanism D1 is engaged, a state where the gear train 10 is able to transmit torque to the output shaft 9 is established. The intermeshing engagement mechanism D1 is for example, a mechanism that transmits torque by meshing spline teeth formed on the inner periphery of a movable sleeve with spline teeth formed on the outer periphery of a hub or a boss. Thus, the intermeshing engagement mechanism D1 is an engagement mechanism configured to change between two states, that is, an engaged state and a released state. That is, the intermeshing engagement mechanism D1 is a mechanism called a dog clutch, a synchronizer, or the like. The intermeshing engagement mechanism D1 is referred to as a dog clutch D1 in the following description. In the example shown in FIG. 7, the dog clutch D1 is formed of a synchronizer. The synchronizer couples the driven gear 10d to the output shaft 9 by meshing the spline teeth formed on the inner periphery of the sleeve with the spline teeth formed on the boss of the driven gear 10d and the spline teeth formed on the hub of the output shaft 9. The sleeve is allowed to move back and forth by an appropriate actuator. The actuator may be a hydraulic actuator that operates by hydraulic pressure.

Torque is configured to be output from the output shaft 9 via a predetermined gear train 11 and a differential 12 to drive shafts 13. That is, an output gear 9a is connected to an end (right side in the example shown in FIG. 7) of the output shaft 9 across from the CVT 8. A large-diameter gear 11a that is in mesh with the output gear 9a is connected to one end (right side in the example shown in FIG. 7) of a speed reduction gear shaft 11b. A small-diameter gear 11c is connected to the other end (left side in the example shown in FIG. 7) of the speed reduction gear shaft 11b. The small-diameter gear 11c is in mesh with the ring gear 12a of the differential 12. The differential 12 is configured to transmit torque, transmitted via the ring gear 12a, from the right and left drive shafts 13 to drive wheels (not shown).

An electronic control unit (ECU) 14 is provided. The ECU 14 controls the operation of the transmission 1. The ECU 14 is mainly formed of a microcomputer as an example. The ECU 14 is configured to perform computations in accordance with a predetermined program on the basis of input data and prestored data and execute control over various states, such as forward traveling, reverse traveling, neutral state, setting of a required speed ratio, and the like.

On the other hand, detection signals and information signals from various sensors are configured to be input to the ECU 14. For example, detection signals from a pulley rotation speed sensor (not shown), a shift position sensor (not shown), a wheel speed sensor (not shown), a sensor (not shown) that detects a depression angle (accelerator operation amount) of an accelerator pedal 16, and the like, are configured to be input to the ECU 14. The pulley rotation speed sensor detects the rotation speed of each of the primary pulley 8a and the secondary pulley 8b. The shift position sensor detects a shift position that is selected by a shift device 15. The wheel speed sensor detects the rotation speed of each wheel of the vehicle for obtaining a vehicle speed.

The thus configured automatic transmission 1 is controlled so as to transmit torque to the output shaft 9 via a torque transmission path including the gear train 10 when the vehicle starts moving in the forward direction or when the vehicle travels in the reverse direction. When the vehicle travels forward in a state where the vehicle speed has increased to some extent, the automatic transmission 1 is controlled so as to transmit torque from the input shaft 5 to the output shaft 9 via a torque transmission path including the CVT 8. For example, when a drive position is selected by the shift device 15, the first clutch mechanism C1 and the dog clutch D1 are engaged, and the second clutch mechanism C2 and the brake mechanism B are released.

FIG. 8 collectively shows the engaged and released states of the engagement mechanisms in controlling the transmission 1. In FIG. 8, "ON" indicates an engaged state, and "OFF" indicates a released state.

When the vehicle starts moving in the forward direction, torque output from the engine 2 is transmitted to the sun gear 6a of the forward/reverse switching mechanism 6 via the input shaft 5 by setting the engagement mechanisms as shown in the table of FIG. 8. The torque output from the engine 2 is transmitted to the carrier 6e via the first clutch mechanism C1. In this case, the two rotating elements of the forward/reverse switching mechanism 6 are coupled by the first clutch mechanism C1, so the whole forward/reverse switching mechanism 6 is integrated. Torque is transmitted from the input shaft 5 via the carrier 6e to the drive gear 6f. The driven gear 10d in the gear train 10 is coupled to the output shaft 9 by the dog clutch D1, so torque of the input shaft 5 is transmitted to the output shaft 9 via the gear train 10. Torque is transmitted from the output gear 9a via the gear train 11 and the differential 12 to the right and left drive wheels, and the vehicle starts moving.

As described above, when the vehicle starts moving, torque is transmitted from the input shaft 5 to the output shaft 9 via the gear train 10, and the gear train 10 functions as the speed reduction mechanism. The speed ratio in this case is a speed ratio higher than the maximum speed ratio that is allowed to be set by the CUT 8. As a result, the vehicle is able to obtain large driving force. Large torque at the time when the vehicle starts moving is not applied to the CVT 8. Therefore, it is not required to increase hydraulic pressure for setting the torque capacity of the CUT 8, Thus, power that is consumed for generating hydraulic pressure decreases, so it is possible to improve fuel economy, and it is possible to improve the durability of the CVT 8.

After the vehicle starts moving, when the vehicle speed has increased to a predetermined vehicle speed, the first clutch mechanism C1 is released in a state where the speed ratio of the CUT 8 is set to the maximum speed ratio or a speed ratio close to the maximum speed ratio. At the same time, the second clutch mechanism C2 is engaged. In this case, the forward/reverse switching mechanism 6 enters a so-called free rotating state because the first clutch mechanism C1 is further released in a state where the brake mechanism B is released. As a result, transmission of power is interrupted between the input shaft 5 and the gear train 10. In contrast, the secondary pulley 8b is coupled to the output shaft 9 by the second clutch mechanism C2. As a result, the input shaft 5 and the output shaft 9 are coupled to each other so as to transmit torque via the CVT 8. Thus, by gradually reducing the speed ratio of the CVT 8 or changing the speed ratio on the basis of a vehicle speed and an accelerator operation amount, it is possible to set the engine rotation speed to a rotation speed at which fuel economy is high.

On the other hand, when the vehicle travels in the reverse direction, the first clutch mechanism C1 and the second clutch mechanism C2 are released, and the dog clutch D1 and the brake mechanism B are engaged, as shown in FIG. 8. In this case, in the forward/reverse switching mechanism 6, torque from the engine 2 is input to the sun gear 6a in a state where the ring gear 6b is fixed by the brake mechanism B. Therefore, the carrier 6e rotates in an opposite direction with respect to the sun gear 6a. Thus, as in the case of when the vehicle starts moving in the forward direction, torque is transmitted from the input shaft 5 to the output shaft 9 via the gear train 10, and the output shaft 9 rotates in a direction in which the vehicle travels in the reverse direction. The speed ratio in this case is a speed ratio obtained by multiplying the speed ratio of the gear train 10 by the speed ratio of the planetary gear train that constitutes the forward/reverse switching mechanism 6. Torque is transmitted from the output gear 9a via the gear train 11 and the differential 12 to the right and left drive wheels, and the vehicle travels in the reverse direction.

As shown in FIG. 8, by releasing any of the first clutch mechanism C1 and the second clutch mechanism C2, it is possible to set a neutral state where transmission of power is interrupted between the engine 2 and the output shaft 9. In this way, the operation of the forward/reverse switching mechanism 6 is controlled by controlling the engaged/released states of the first clutch mechanism C1, second clutch mechanism C2, dog clutch D1 and brake mechanism B. Thus, it is possible to set each of the forward traveling state, the reverse traveling state and the neutral state. In other words, it is possible to selectively set any one of a forward rotation state, a reverse rotation state and a neutral state. In the forward rotation state, torque in the same rotational direction as the rotational direction of a power source is output from the output shaft 9. In the reverse rotation state, torque in the rotational direction opposite to the rotational direction of the power source is output from the output shaft 9. In the neutral state, transmission of power is interrupted between the power source and the output shaft 9.

In the above-described transmission 1, when the vehicle stops from a forward traveling state, the dog clutch D1 may be released. This is because, other than the time when the vehicle starts moving, there is the case where the vehicle travels in the forward direction by transmitting torque with the CVT 8, changes the speed ratio of the CVT 8 to the maximum with a decrease in vehicle speed, and then stops. Because the first clutch mechanism C1 is released when co-rotation of the gear train 10 is prevented during forward traveling, the first clutch mechanism C1 is also released when the vehicle stops. When the vehicle stops temporarily, the second clutch mechanism C2 is kept in the engaged state, and the engine 2 is kept in a driven state. Because the torque converter 3 is provided, engine stall does not occur, and it is possible to generate creep torque. However, when a main switch (not shown) of the vehicle is turned off or so-called idle stop control is executed, the engine 2 is stopped. In this case, hydraulic pressure is not generated, and the second clutch mechanism C2 is released in order to reduce a load on the engine 2 as much as possible at start-up of the engine 2.

In a state where the engine 2 is stopped in this way, all of the clutch mechanisms C1, C2, dog clutch D1 and brake mechanism B are in the released state. In contrast, when the vehicle starts moving, the first clutch mechanism C1 or the brake mechanism B, and the dog clutch D1 are changed to the engaged state. In this case, the first clutch mechanism C1 and the brake mechanism B each are a hydraulic friction engagement mechanism, so the first clutch mechanism C1 and the brake mechanism B each have a predetermined torque capacity when supplied with hydraulic pressure. In contrast, the dog clutch D1, for example, needs to mesh the spline teeth formed on the sleeve with the spline teeth of the driven gear 10d. In this case, when the phases of the respective spline teeth coincide with each other, the teeth collide with each other and cannot mesh with each other. Such a state may be called uplock state. When the vehicle stops and the engine 2 is stopped, both the dog clutch D1 and the gear train 10 do not rotate, so the vehicle is not able to start moving in an uplock state. Even when the dog clutch D1 is engaged eventually, the start of the vehicle may delay. Therefore, the controller according to the invention is configured to execute control described later in order to reliably engage the above-described dog clutch D1 when the engine 2 is started up in a state where the vehicle is stopped.

Figure 1:
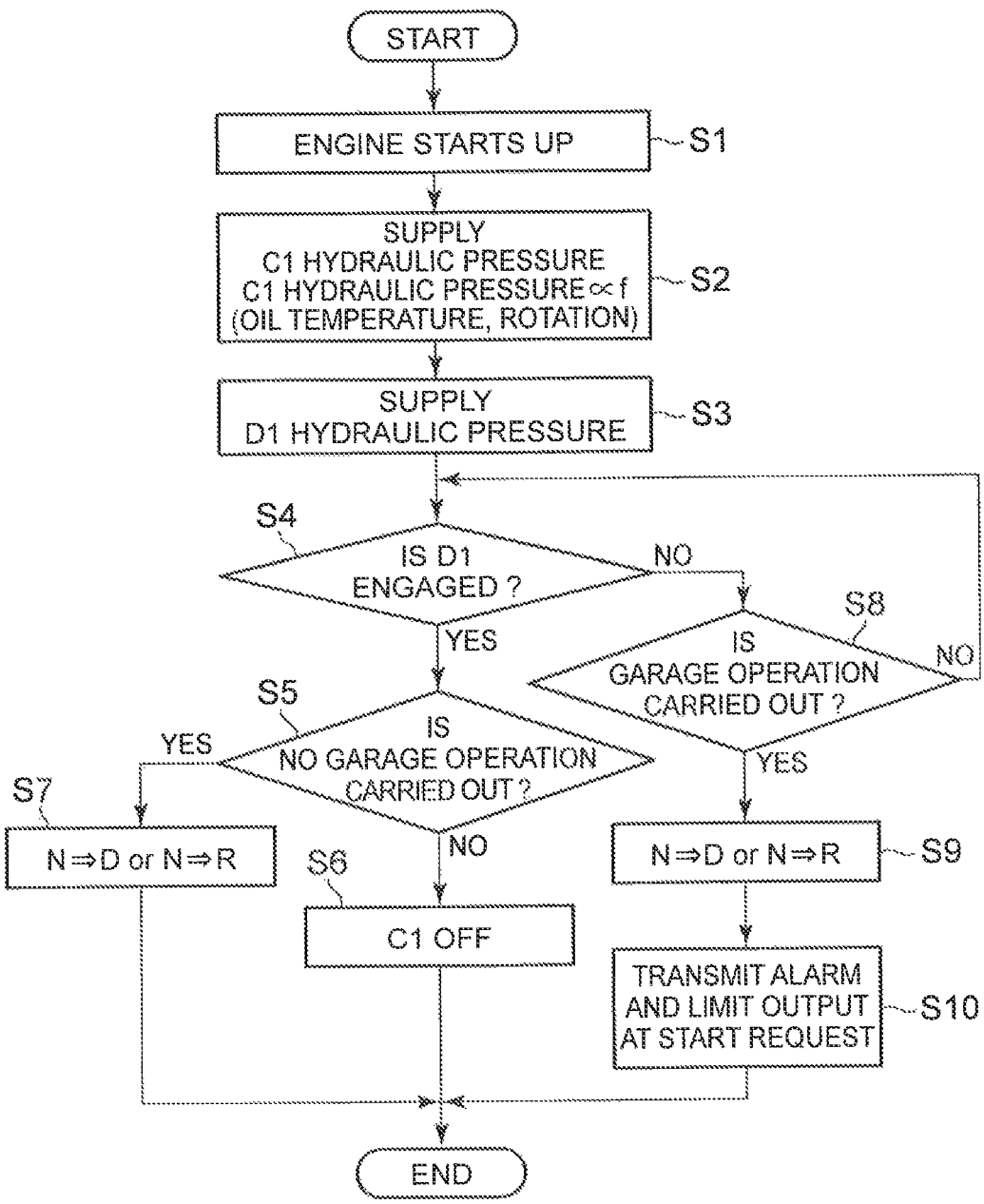
FIG. 1 is a flowchart for illustrating an example of control that is executed by a controller according to the invention.

FIG. 1 is a flowchart for illustrating an example of the control. The routine shown here is repeatedly executed at predetermined short time intervals by the above-described electronic control unit 14. In this control example, initially, start-up control over the engine 2 is executed when a predetermined start-up condition is satisfied, for example, an ignition switch is turned on (step S1). This is control for, for example, cranking (motoring) the engine 2 by energizing a starter motor (not shown), supplying fuel to the engine 2 and further energizing an ignition plug in the case of a gasoline engine. Start-up control over the engine 2 is allowed when a parking position or a neutral position is selected by the above-described shift device 15 and the transmission 1 is in a neutral state. This is to avoid a steep increase in driving torque as a result of start-up of the engine 2.

Subsequently, control for increasing the torque capacity of the first clutch mechanism C1 is executed. When the first clutch mechanism C1 is a hydraulic friction engagement mechanism as described above, a command signal for supplying a predetermined hydraulic pressure is output (step S2). When start-up control over the engine 2 is executed and the engine 2 is rotated, an oil pump (not shown) rotates accordingly to generate hydraulic pressure, and the hydraulic pressure is supplied to the first clutch mechanism C1 Control for increasing the hydraulic pressure of the first clutch mechanism C1 to increase the torque capacity of the first clutch mechanism C1 in this way is control for slowly rotating the gear train 10 (particularly, the driven gear 10d that is an output-side member of the gear train 10) corresponding to a transmission mechanism in the invention with torque that is transmitted from the engine 2 to the input shaft 5 or rotating the gear train 10 with torque as small as possible. Thus, the predetermined hydraulic pressure for engaging the first clutch mechanism C1 is a hydraulic pressure set to a pressure as low as possible within the range in which it is possible to rotate the gear train 10. The predetermined hydraulic pressure does not need to be a constant pressure and may be a pressure determined by a function having parameters, such as an oil temperature and the rotation speed of the gear train 10.

By controlling the hydraulic pressure of the first clutch mechanism C1 in this way, the first clutch mechanism C1 is set to a slip state where a drive-side member and driven-side member of the first clutch mechanism C1 are in sliding contact with each other. When the slip rotation speed changes or a load on the engine 2 fluctuates because of, for example, repetition of a slip state and a non-slip state and this becomes a factor of fluctuations in engine rotation speed, rotation speed control just needs to be executed by an idle speed control valve (ISC valve) provided in the engine 2.

Simultaneously with such control over the first clutch mechanism C1 or subsequent to control over the first clutch mechanism C1, a command signal for supplying hydraulic pressure is output in order to engage the dog clutch D1 (step S3). That is, in the invention, without a delay of engagement of the dog clutch D1, control for increasing the torque capacity of the first clutch mechanism C1 that is the friction engagement mechanism to such a small capacity that the gear train 10 rotates. After that, it is determined whether the dog clutch D1 is engaged (step S4). In the example shown in FIG. 7, because the dog clutch D1 is configured to move the sleeve in the axial direction to couple the output shaft 9 to the driven gear 10d, engagement of the dog clutch D1 is allowed to be detected by the stroke of the sleeve. Thus, determination of step S4 may be carried out by detecting the stroke of the sleeve or actuator that moves the sleeve by using a stroke sensor, a stroke switch, or the like.

As described above, control for engaging the dog clutch D1 is executed in a state where control for engaging the first clutch mechanism C1 is started and the gear train 10 is slowly or slightly rotating. Therefore, even when the teeth that should be meshed with each other in the dog clutch D1 initially coincide with each other in phase, the upstream-side driven gear 10d of the dog clutch D1 in the torque transmission direction rotates and the phases of those teeth shift from each other, so the uplock state where the teeth remain colliding with each other is avoided, and it is possible to reliably and smoothly engage the dog clutch D1. When the phases of the teeth coincide with each other in a stopped state and the uplock state can occur, because the phases are shifted by a half of the pitch at which the teeth are provided, with the result that it is possible to mesh the teeth with each other. When the phases of the teeth shift from each other in a stopped state and no uplock state can occur, the teeth mesh with each other as a result of a shift of the phases by about the pitch at which the teeth are provided.

When the dog clutch D1 is set to the engaged state in this way, because the first clutch mechanism C1 already has a torque capacity, the input shaft 5 and the output shaft 9 are coupled to each other by the gear train 10. However, the vehicle is stopped and braking force is applied to the drive wheels, accordingly, rotation of the output shaft 9 is stopped, and the torque capacity of the first clutch mechanism C1 is set to such a small capacity that the gear train 10 slowly rotates, the first clutch mechanism C1 slips at the time when the dog clutch D1 is engaged. That is, because torque that is transmitted to the output shaft 9 is slight, an excessive increase in driving torque or a shock, vibrations of a vehicle body, or the like, resulting from an excessively increase in driving torque is prevented or suppressed. In other words, a feeling of strangeness resulting from control for engaging the dog clutch D1 is avoided or suppressed.

When affirmative determination is made in step S4 as a result of engagement of the dog clutch D1, it is determined whether no garage operation is carried out (step S5). Garage operation is an operation to select a drive state, such as the drive position and a reverse position, by the shift device 15 for causing the vehicle to start moving. Because the shift device 15 includes a position switch, it is possible to carry out determination of step S5 on the basis of an electric signal that is output from the switch. When negative determination is made in step S5 because of the fact that no operation to select the drive state is performed, control for releasing (control for turning off) the first clutch mechanism C1 that is controlled to a small torque capacity is executed (step S6). This is because the stopped state of the vehicle is continued and, therefore, it is not required to transmit torque to the output shaft 9. After that, the routine of FIG. 1 is once ended. In contrast, when affirmative determination is made in step S5 because of the fact that garage operation is carried out, a position signal (D signal or R signal) corresponding to a shift position selected by the garage operation is output instead of a neutral signal (N signal) (step S7), after which the routine of FIG. 1 is once ended. The position signal is a signal for, for example, indicating the shift position on an instrument panel (not shown) or operating a predetermined valve in a hydraulic control device (not shown).

On the other hand, when negative determination is made in step S4, that is, when engagement of the dog clutch D1 is not detected, it is determined whether garage operation is carried out (step S8). This may be carried out similarly to determination in step S5. When negative determination is made in step S8 because of the fact that no garage operation is carried out, the process returns to step S4, and the original control state is continued. On the contrary, when affirmative determination is made in step S8 because of the fact that garage operation is carried out, the signal (D signal or R signal) corresponding to the shift position selected by the garage operation is output instead of the neutral signal (N signal) (step S9).

The state where the position signal is output in this way is a state where a driver intends to cause the vehicle to start moving and a display of the shift position indicates the drive state; however, the dog clutch D1 is not engaged, so the above state is a state where torque is not transmitted to the output shaft 9. Thus, when there is a request for the vehicle to start moving, such as the fact that the accelerator pedal 16 is depressed, an alarm that notifies the driver of the fact that the dog clutch D1 is in the released state or the vehicle is not able to start moving is issued, and the output of the engine 2 is limited to an output lower than the output based on the driver's start request (step S10). The alarm may be specifically voice or a display of a lamp or text. Limitation on output may be limitation on a throttle opening degree, such as that an electronic throttle valve does not open even when the accelerator pedal 16 is depressed. After that, the routine of FIG. 1 is once ended.

Figure 2:
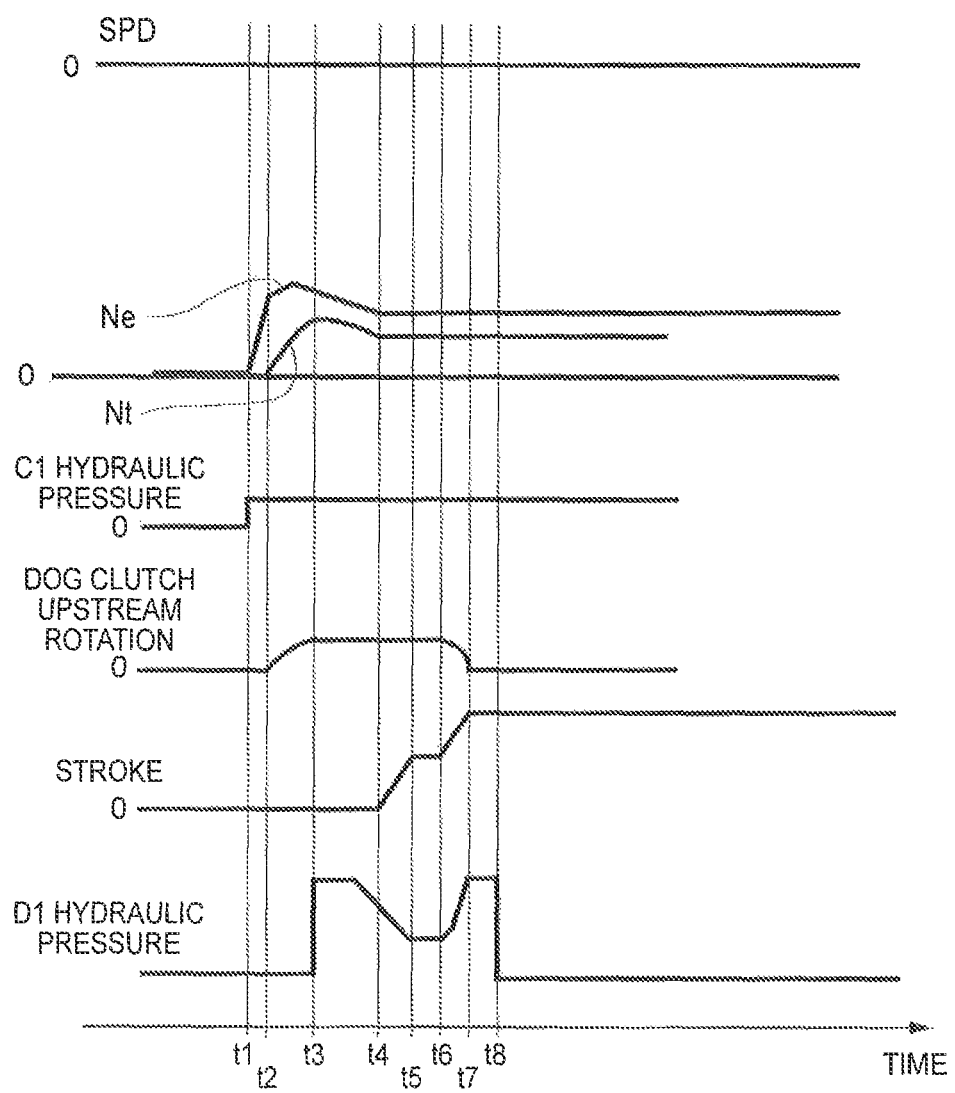
FIG. 2 is a time chart that schematically shows an example of changes in hydraulic pressures and rotation speeds when the control is executed.

FIG. 2 is a time chart that shows changes in rotation speeds, hydraulic pressures, and the like, when the above-described control is executed. Because the vehicle is stopped by stopping the engine 2, all of the vehicle speed SPD, the engine rotation speed Ne and a turbine rotation speed Nt that is the output-side rotation speed of the torque converter 3 are "0". Thus, the upstream-side rotation speed of the dog clutch D1, that is, the rotation speed of the driven gear 10d, is also "0". In addition, both the first clutch mechanism C1 and the dog clutch D1 are released, no hydraulic pressure is supplied to the first clutch mechanism C1 or the dog clutch D1, and the hydraulic pressure is "0" or a low pressure close to "0".

When a start-up request for the engine 2 is satisfied as a result of, for example, the fact that the ignition switch is turned on in this state (t1 timing), the engine 2 is cranked by the starter motor, and the rotation speed Ne gradually increases. In the case of the vehicle that is configured to drive the oil pump by the engine 2, hydraulic pressure is generated as the engine 2 rotates, so a command value of the hydraulic pressure of the first clutch mechanism C1 is increased to a predetermined value in order to supply the hydraulic pressure to the first clutch mechanism C1. As described above, the command value is a command value for setting such a small torque capacity that the gear train 10 slowly rotates, and is determined in advance.

Start-up of the engine 2 is carried out in the neutral state of the transmission 1, so the second clutch mechanism C2 is released, and the CVT 8 and the input shaft 5 are rotatable. Thus, when the engine 2 is cranked to rotate, the turbine runner 3c of the torque converter 3 rotates together with the input shaft 5. In this state, torque is transmitted from the input shaft 5 to the gear train 10 and the gear train 10 starts rotating as a result of the fact that the first clutch mechanism C1 begins to have a torque capacity, and the rotation speed (that is the upstream-side rotation speed of the dog clutch D1) of the driven gear 10d starts increasing (t2 timing). In process in which the upstream-side rotation speed of the dog clutch D1 is increasing, when first combustion (initial combustion) occurs in the engine 2, the engine rotation speed Ne gradually decreases toward an idle rotation speed. The upstream-side rotation speed of the dog clutch D1 reaches a rotation speed based on the torque capacity of the first clutch mechanism C1.

After that, a command signal for engaging the dog clutch D1 is output, and the hydraulic pressure increases to a predetermined hydraulic pressure (t3 timing). The dog clutch D1 or a mechanism that moves the sleeve has a slight clearance, so hydraulic pressure slightly decreases because of movement that the clearance is filled. After that, the sleeve of the dog clutch D1 starts moving (t4 timing). Thus, the hydraulic pressure of a hydraulic chamber in the actuator that engages the dog clutch D1 continues decreasing.

When the dog clutch D1 is formed of a conventionally known synchronizer, tapered faces of a synchronizer ring contact with each other as a result of movement of the sleeve to cause the function of synchronizing the rotation speeds, or chamfers formed at ends of the teeth contact with each other, so movement (stroke) of the sleeve temporarily stops (t5 timing). Therefore, the decreasing tendency of the hydraulic pressure of the dog clutch D1 decreases.

As described above, with the controller according to the invention, rotation is generated at the upstream side of the dog clutch D1 by engaging the first clutch mechanism C1 so that the first clutch mechanism C1 has a small torque capacity, so there occurs a shift in phase between the teeth that mesh with each other in the dog clutch D1. Therefore, even when the teeth collide with each other, the collision state is immediately eliminated, and the sleeve moves so that the teeth mesh with each other. That is, the sleeve further moves immediately after the t5 timing, and the dog clutch D1 substantially starts engagement (t6 timing). In this case, sliding resistance is applied as a result of meshing of the teeth, so the hydraulic pressure of the dog clutch D1 increases.

When the sleeve reaches a stroke end, engagement of the dog clutch D1 completes (t7 timing). In this case, because the vehicle is stopped and the output shaft 9 is not rotating, the upstream-side rotation speed of the dog clutch D1 decreases as a result of engagement of the dog clutch D1, and finally stops. When the engagement of the dog clutch D1 is detected, the sleeve does not move any more, so the hydraulic pressure of the dog clutch D1 increases to a pressure based on the command value. The hydraulic pressure is kept in order to establish the engaged state, and, after that, the hydraulic pressure of the dog clutch D1 is reduced (t8 timing). Because the dog clutch D1 is configured to keep each of the engaged state and the released state, the dog clutch D1 keeps the completely engaged state even when the hydraulic pressure is reduced.

As described with reference to FIG. 2, with the controller according to the invention, when the dog clutch D1 that couples the gear train 10, which is a transmission mechanism in the invention, to the output shaft 9 is engaged with start-up of the engine 2 in a state where the vehicle is stopped, the upstream-side member (driven gear 10d) of the dog clutch D1 is rotated by a small torque. Thus, with the controller according to the invention, even when the phases of the teeth that mesh with each other in the dog clutch D1 coincide with each other before start-up of the engine 2, it is possible to reliably and smoothly engage the dog clutch D1 by avoiding a so-called uplock.

Next, another control example that is executed by the controller according to the invention will be described. The above-described friction engagement mechanism for increasing the upstream-side rotation speed of the dog clutch D1 is a mechanism that is engaged in setting the drive state. In the transmission 1 having the configuration shown in FIG.

7, the friction engagement mechanism is the first clutch mechanism C1 that sets the forward traveling state or the brake mechanism B that sets the reverse traveling state. Thus, these friction engagement mechanisms each are supplied with hydraulic pressure to be engaged when the drive position or the reverse position is selected by the shift device 15. Therefore, in the controller according to the invention, rotation of the transmission mechanism in engaging the dog clutch D1 may be generated by utilizing such shift operation (garage operation).

Figure 3:
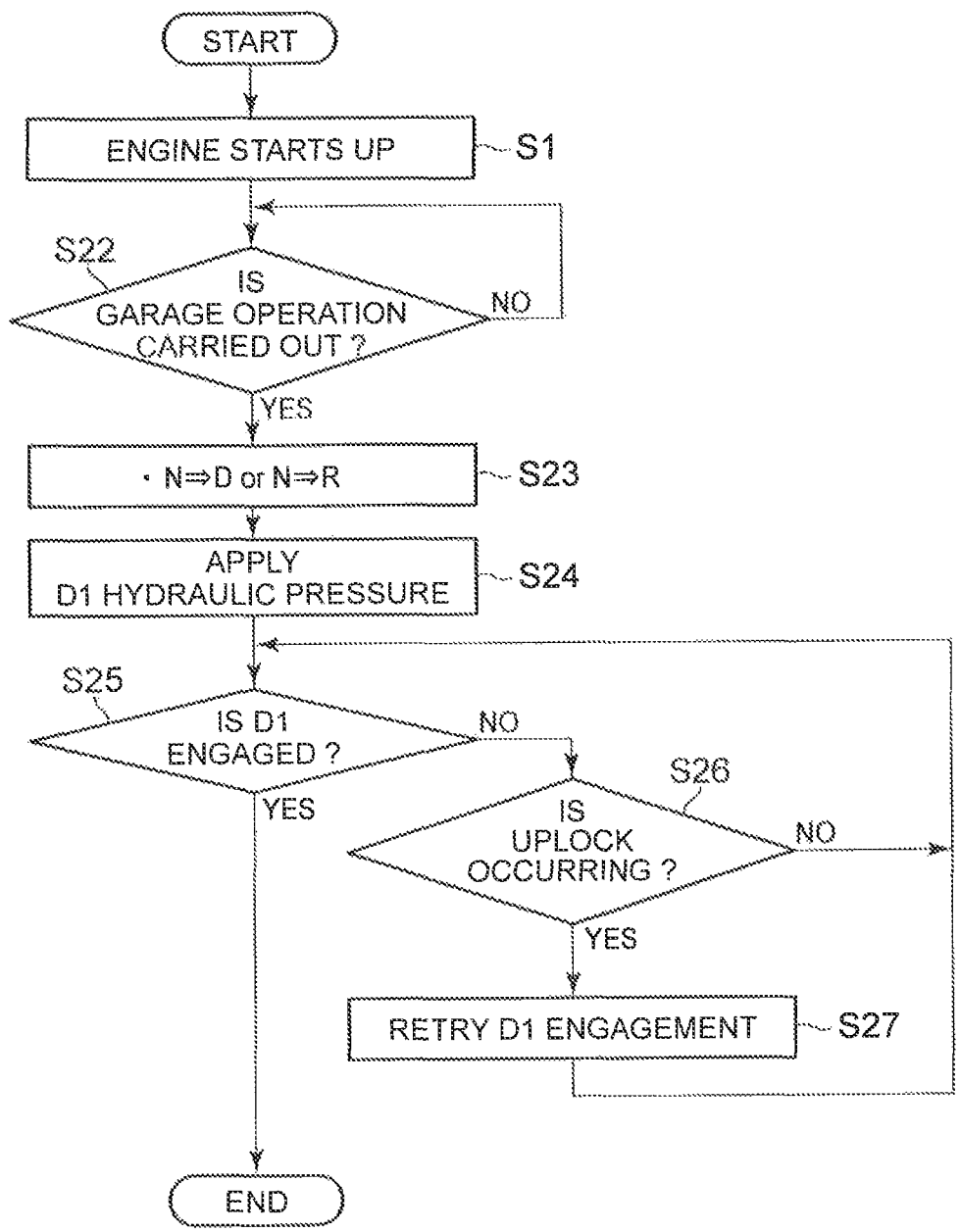
FIG. 3 is a flowchart for illustrating an example of another control that is executed by the controller according to the invention.

FIG. 3 is a flowchart for illustrating the control example. The routine shown here is repeatedly executed at predetermined short time intervals by the above-described electronic control unit 14. In this control example, initially, start-up control over the engine 2 is executed when a predetermined start-up condition is satisfied, for example, the ignition switch is turned on (step S21). This is similar control to that of step S1 in the above-described control example shown in FIG. 1. Subsequently, it is determined whether garage operation is carried out (step S22). This is similar determination step to that of step S8 in the above-described control example shown in FIG. 1, and may be determined on the basis of whether a signal is output from the shift device 15. When negative determination is made in step S22, that is, when garage operation is not carried out, the original control state is continued without starting new control.

In contrast, when affirmative determination is made in step S22 as a result of the fact that garage operation is carried out, the signal (D signal or R signal) corresponding to the position selected by the operation is output instead of the neutral signal (N signal) (step S23). In the control example shown in FIG. 3, control over the first clutch mechanism C1 or the brake mechanism B is executed on the basis of the position signal. That is, these friction engagement mechanisms each are a mechanism that transmits torque for propelling the vehicle, so each friction engagement mechanism is eventually set to a torque capacity (hydraulic pressure) that is determined on the basis of a required driving amount, such as the accelerator operation amount; however, at the beginning of engagement, each friction engagement mechanism is set to a small torque capacity as in the case of control of step S2 in the above-described control example shown in FIG. 1. Specifically, hydraulic pressure that transmits such a small torque that the gear train 10 corresponding to the transmission mechanism in the invention slowly rotates is supplied to the first clutch mechanism C1 or the brake mechanism B. The hydraulic pressure may be a hydraulic pressure that is determined on the basis of an oil temperature, a rotation speed, and the like, as in the case of the control example shown in FIG. 1.

At the same time, or subsequently, hydraulic pressure is supplied in order to engage the dog clutch D1 (step S24). This is similar control to control of step S3 in the above-described control example shown in FIG. 1. When hydraulic pressure is supplied to the dog clutch D1, the sleeve of the dog clutch D1 is moved in the axial direction in the transmission 1 having the configuration shown in FIG. 7. In this case, the first clutch mechanism C1 or the brake mechanism B is engaged at a small torque capacity and the gear train 10 is slowly rotating, so the phases of the teeth in the dog clutch D1 do not remain coinciding with each other, and those teeth mesh with each other as a result of movement of the sleeve. That is, no uplock occurs or an uplock is immediately eliminated.

After hydraulic pressure is applied to the dog clutch D1 in step S24, it is determined whether the dog clutch D1 is engaged (step S25) as in the case of the control example shown in FIG. 1. Because the routine of FIG. 3 is repeatedly executed at predetermined short time intervals, determination as to whether the dog clutch D1 is engaged corresponds to determination as to whether the dog clutch D1 is engaged within a cycle time (within a predetermined time) of the routine of FIG. 3. When affirmative determination is made in step S25 as a result of the fact that the dog clutch D1 is engaged, control shown in FIG. 3 is once ended. On the contrary, when negative determination is made in step S25 as a result of the fact that engagement of the dog clutch D1 is not detected, it is determined whether there occurs a so-called uplock state (step S26). This determination may be carried out on the basis of determination as to whether the sleeve has moved a predetermined distance.

When affirmative determination is made in step S26, control for engaging the dog clutch D1 is executed again (step S27). This control is control for once reducing or cancelling hydraulic pressure for engaging the dog clutch D1 and then supplying hydraulic pressure again. The process returns to the timing before step S25, and it is determined again whether the dog clutch D1 is engaged. When negative determination is made in step S26 because of the fact that no uplock is occurring, for example, the sleeve has not moved the predetermined distance, the process returns to the timing before step S25, and control for engaging the dog clutch D1 is continued.

Figure 4:
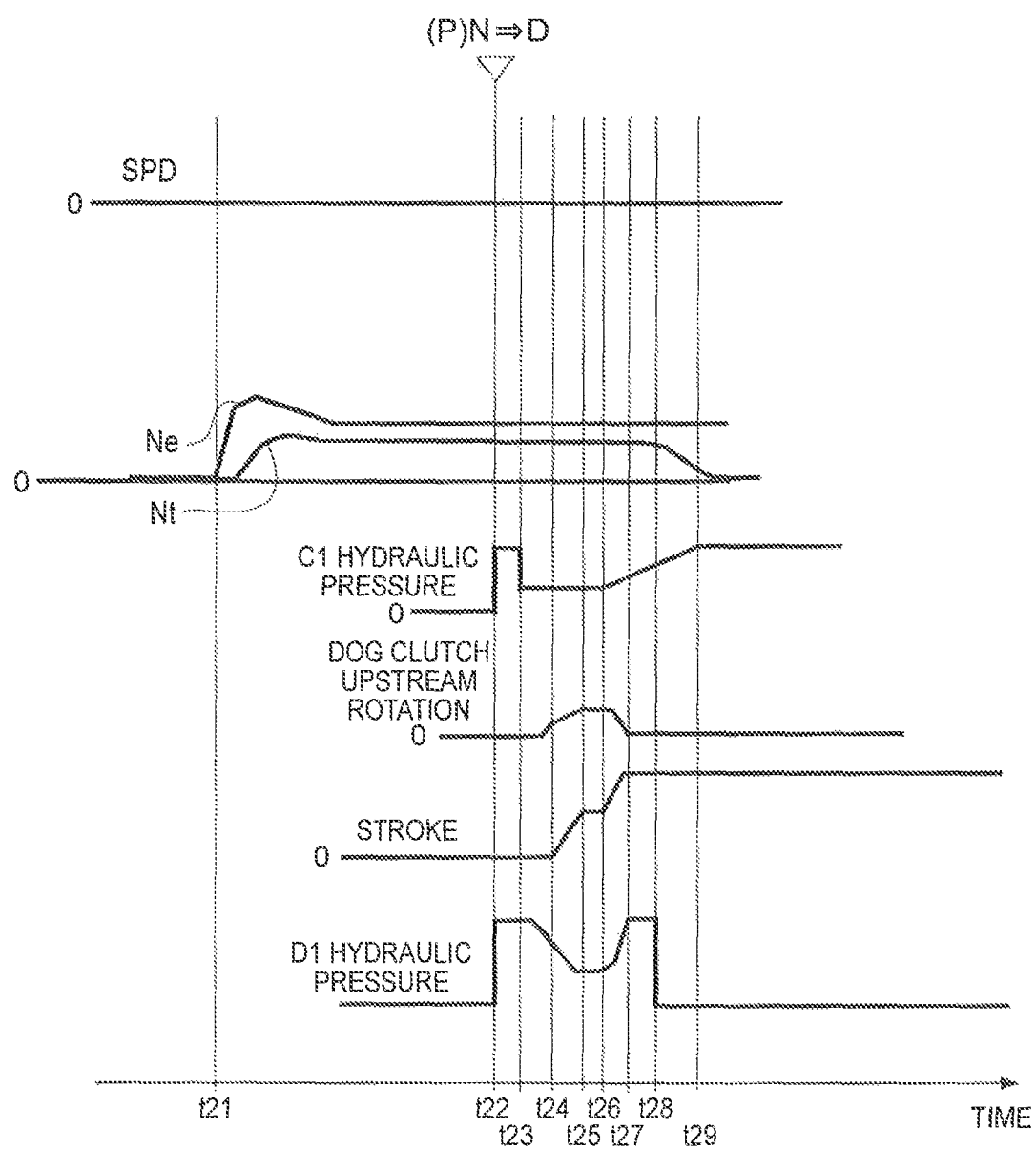
FIG. 4 is a time chart that schematically shows an example of changes in hydraulic pressures and rotation speeds when the control is executed.

FIG. 4 is a time chart that shows changes in rotation speeds, hydraulic pressures, and the like, when control shown in FIG. 3 is executed. In a state where the engine 2 is stopped and the vehicle is stopped, any of the vehicle speed SPD, the engine rotation speed Ne and the turbine rotation speed Nt is set to "0". When the engine 2 is started up in this state (t21 timing), the engine rotation speed Ne increases, and the turbine rotation speed Nt (that is, the input shaft rotation speed) increases with a slight delay. When shift operation (garage operation) for changing from the neutral (N) position or parking (P) position to the drive (D) position is carried out at t22 timing thereafter, control for engaging the first clutch mechanism C1 at a small torque capacity and control for engaging the dog clutch D1 are started. Engagement control over the first clutch mechanism C1 will be described. A supply pressure is temporarily set to a high hydraulic pressure. This is control called first fill, and is control for filling a clearance (pack) arising in the first clutch mechanism C1. At t23 timing thereafter, the hydraulic pressure of the first clutch mechanism C1 is reduced to a hydraulic pressure that provides such a small torque capacity that the gear train 10 slowly rotates, and the hydraulic pressure is kept. Because the sleeve moves as a result of filling of the pack, the hydraulic pressure of the dog clutch D1 starts decreasing.

As the torque capacity of the first clutch mechanism C1 gradually increases in this way, torque is transmitted to the gear train 10, and the gear train 10 starts rotating. That is, the upstream-side rotation speed of the dog clutch D1 starts increasing. After that, as in the above-described case shown in FIG. 2, the rotation speeds and the hydraulic pressures change. When this will be described simply, the sleeve of the dog clutch D1 starts moving at t24 timing. As a result, when the tapered face of the synchronizer ring contacts the counter tapered face or the teeth contact with each other, the stroke of the sleeve once stops (t25 timing), and a reduction in the hydraulic pressure of the dog clutch D1 decreases or the hydraulic pressure becomes a constant pressure. Because the upstream-side member (that is, the driven gear 10d) of the dog clutch D1 is rotating, substantial meshing of the teeth begins at t26 timing. That is, the sleeve further moves. In this case, the hydraulic pressure increases by sliding resistance, or the like, as a result of meshing of the teeth. Because the gear train 10 is coupled to the output shaft 9 that is not rotating as a result of engagement of the dog clutch D1, the upstream-side rotation speed of the dog clutch D1 decreases toward a stop. The sleeve reaches the stroke end and the dog clutch D1 is substantially completely engaged at t27 timing, the hydraulic pressure reaches a command hydraulic pressure accordingly, and the hydraulic pressure is kept. At t28 timing thereafter, the hydraulic pressure of the dog clutch D1 is set to a hydraulic pressure for keeping the engaged state, and the engagement control completes. When a mechanism for keeping the engaged state is provided, the hydraulic pressure may be returned to "0".

On the other hand, the hydraulic pressure of the first clutch mechanism C1 is kept at a low hydraulic pressure until t26 timing at which substantial engagement of the dog clutch D1 begins; however, when substantial engagement of the dog clutch D1 begins, the hydraulic pressure of the first clutch mechanism C1 is gradually increased toward a hydraulic pressure based on a required driving amount of the vehicle. The hydraulic pressure of the first clutch mechanism C1 reaches a hydraulic pressure based on the required driving amount after t28 timing at which engagement control over the dog clutch D1 has completed (t29 timing), and the hydraulic pressure of the first clutch mechanism C1 is kept at that hydraulic pressure.

Thus, even in the case where control shown in FIG. 3 is executed, when the dog clutch D1 is engaged at start-up of the engine 2, and even when the phases of the teeth that mesh with each other in the dog clutch D1 coincide with each other before start-up of the engine 2, it is possible to avoid a so-called uplock and reliably and smoothly engage the dog clutch D1.

Figure 5:
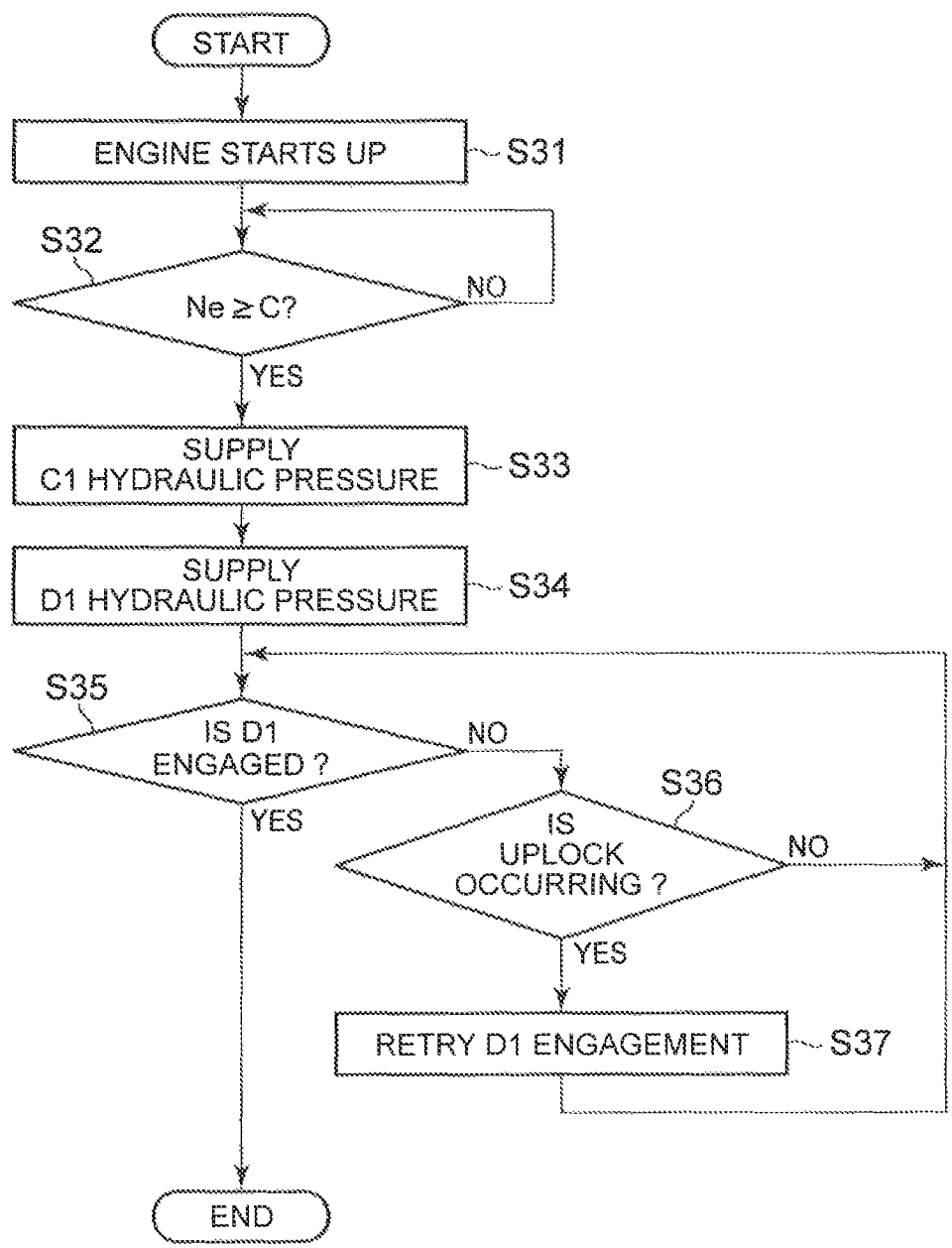
FIG. 5 is a flowchart for illustrating an example of further another control that is executed by the controller according to the invention.

The above-described control examples are examples in which engagement control over the dog clutch D1 is started after initial combustion of the engine 2 in start-up control over the engine 2. In the invention, a delay of the start of the vehicle may be configured to be avoided or suppressed by starting engagement control over the dog clutch D1 at a further early timing. FIG. 5 shows an example of the control. The example shown here is an example configured to, after the beginning of start-up (cranking) of the engine 2, start engagement control over the first clutch mechanism C1 and the dog clutch D1 on the condition that the engine rotation speed Ne becomes higher than or equal to a predetermined reference value C. The reference value C may be an elapsed time from the beginning of start-up control over the engine 2.

More specifically, the routine shown in FIG. 5 is repeatedly executed at predetermined short time intervals by the above-described electronic control unit 14. In this control example, initially, start-up control over the engine 2 is executed (step S31). This is similar control to that of step S1 in the above-described control example shown in FIG. 1. Subsequently, it is determined whether the rotation speed Ne of the engine 2 that is being cranked becomes higher than or equal to the predetermined reference value C (step S32). The reference value C is a rotation speed for determining the timing of engagement control over the first clutch mechanism C1 and the dog clutch D1 described below, and is set to a value lower than the rotation speed at which initial combustion occurs in the engine 2. More specifically, a time until the dog clutch D1 starts substantial engagement after engagement control over the dog clutch D1 is started is obtained in advance, a predicted value of the engine rotation speed at the timing the period of time before the initial combustion occurs just needs to be set as the reference value C.

When negative determination is made in step S32 because of the fact that the engine rotation speed Ne is lower than the reference value C, original engine start-up control is continued without executing new control. In contrast, when affirmative determination is made in step S32 because of the fact that the engine rotation speed Ne is higher than or equal to the reference value C, engagement control over the first clutch mechanism C1 and engagement control over the dog clutch D1 are started by respectively supplying hydraulic pressures to the first clutch mechanism C1 and the dog clutch D1 (step S33, step S34). These controls are similar controls to controls in step S2 and step S3 in the above-described control shown in FIG. 1, and hydraulic pressure that sets a torque capacity to such extent that it is possible to slowly rotate the gear train 10 is supplied to the first clutch mechanism C1. For example, hydraulic pressure that is able to move the sleeve in the engaging direction is supplied to the dog clutch D1.

After that, it is determined whether the dog clutch D1 is engaged (step S35). When affirmative determination is made in step S35 because of the fact that the dog clutch D1 is engaged, the routine shown in FIG. 5 is once ended. In contrast, when negative determination is made in step S35 because of the fact that engagement of the dog clutch D1 is not detected, it is determined whether the dog clutch D1 is in the uplock state (step S36). When affirmative determination is made in step S36 because of the fact that the uplock state is occurring, control for engaging the dog clutch D1 is executed again (step S37), and, after that, the process returns to the timing before step S35, and control for engaging the dog clutch D1 is continued. When negative determination is made in step S36 because of the fact that no uplock is occurring, for example, the sleeve is not moved the predetermined distance, the process returns to the timing before step S35, and control for engaging the dog clutch D1 is continued. These controls in step S35 to step S37 are similar to controls in step S25 to step S27 in the above-described control example shown in FIG. 3.

Figure 6:
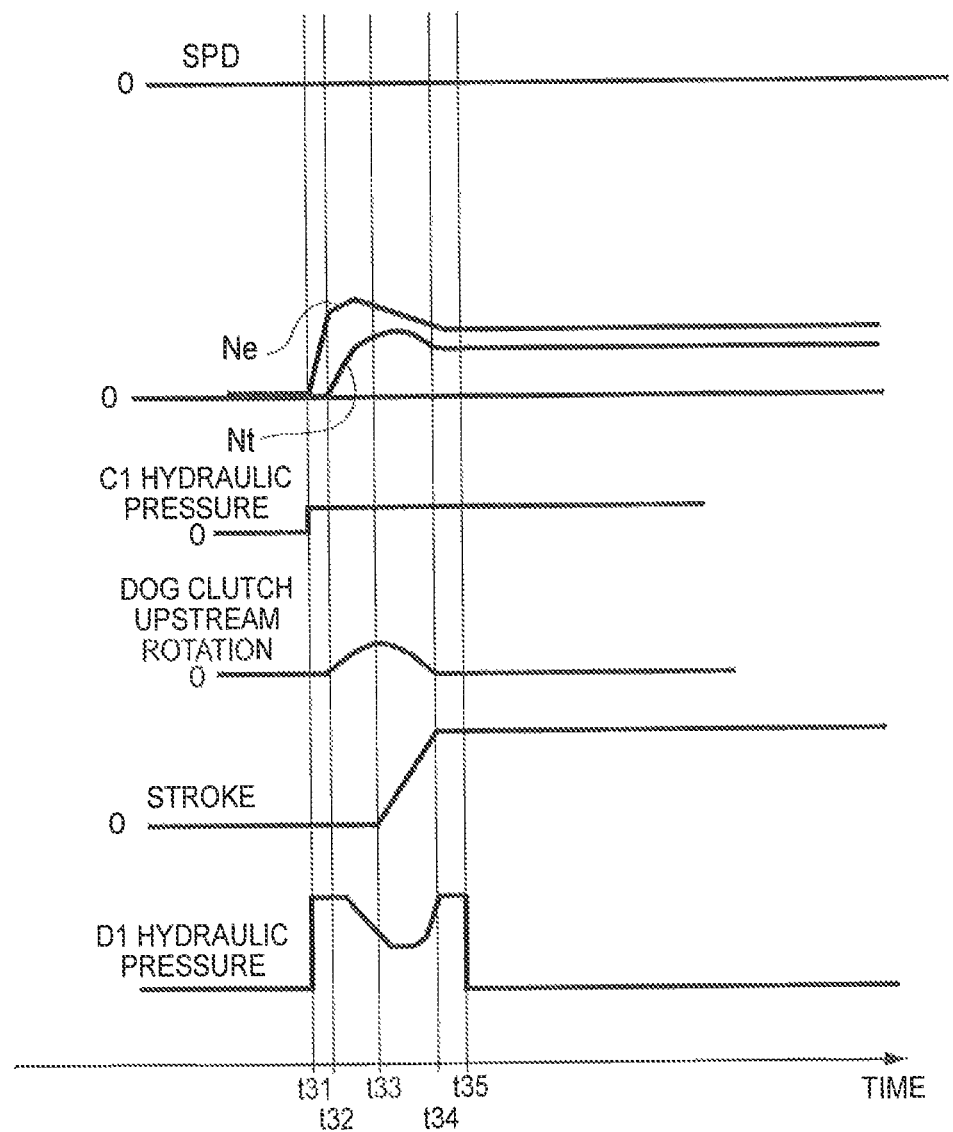
FIG. 6 is a time chart that schematically shows an example of changes in hydraulic pressures and rotation speeds when the control is executed.

FIG. 6 is a time chart that shows changes in rotation speeds, hydraulic pressures, and the like, when the above-described control shown in FIG. 5 is executed. When the engine 2 is started up in a state where the engine 2 is stopped and the vehicle is stopped (t31 timing), the engine 2 is cranked and the rotation speed Ne of the engine 2 starts increasing, and the turbine rotation speed Nt starts increasing with a slight delay. However, because the above-described reference value C is a small value, control for increasing the hydraulic pressures of the first clutch mechanism C1 and dog clutch D1 is started immediately after the beginning of start-up of the engine 2. The hydraulic pressure that is supplied to the first clutch mechanism C1 is a hydraulic pressure that sets such a torque capacity that the gear train 10 slowly rotates. Thus, at t32 timing, the gear train 10 starts rotating, and the upstream-side rotation speed of the dog clutch D1 gradually increases.

On the other hand, because hydraulic pressure that sets the dog clutch D1 to the engaged state is supplied to the dog clutch D1, the sleeve starts moving substantially simultaneously with initial combustion of the engine 2, and the dog clutch D1 starts substantial engagement (t33 timing). The hydraulic pressure of the dog clutch D1 changes similarly to the above-described example shown in FIG. 2 or FIG. 4. In this case, because the output shaft 9 to which the gear train 10 is coupled by the dog clutch D1 is stopped, when the dog clutch D1 starts engagement, the upstream-side rotation speed is gradually reduced, and finally the rotation stops. When the engine 2 starts autonomous rotation and then reaches an engine rotation speed about an idling rotation speed, the dog clutch D1 is completely engaged substantially at the same time (t34 timing). That is, the sleeve reaches the stroke end. After that, at t35 timing at which a time for establishing a state where the dog clutch D1 is completely engaged has elapsed, the hydraulic pressure of the dog clutch D1 is reduced.

Thus, when the controller is configured to execute control shown in FIG. 5, engagement of the dog clutch D1 completes substantially simultaneously with completion of start-up of the engine 2. Therefore, with such a configuration, it is possible to avoid a so-called uplock state of the dog clutch D1 that is the intermeshing engagement mechanism, and to shorten a time required for engagement by increasing the rate of engagement. In other words, it is possible to quickly establish a so-called start standby state.

The transmission that is employed as an object in the invention just needs to be a transmission in which a continuously variable transmission mechanism and a transmission mechanism having a constant speed ratio are provided in parallel with each other between an input shaft and an output shaft. The transmission includes a friction engagement mechanism and an intermeshing engagement mechanism. The friction engagement mechanism transmits torque of the input shaft to the transmission mechanism. The intermeshing engagement mechanism is arranged in series with the friction engagement mechanism on a downstream side in the torque transmission direction, and sets the transmission mechanism to a state where torque is transmittable to the output shaft. The example will be simply described below. In the configuration described below, the position of the first clutch mechanism C1, dog clutch D1 or forward/reverse switching mechanism 6 is changed in the above-described configuration shown in FIG. 7, so like reference numerals to those in FIG. 7 denote the same component members as the component members shown in FIG. 7, and the detailed description is omitted.

Figure 9:
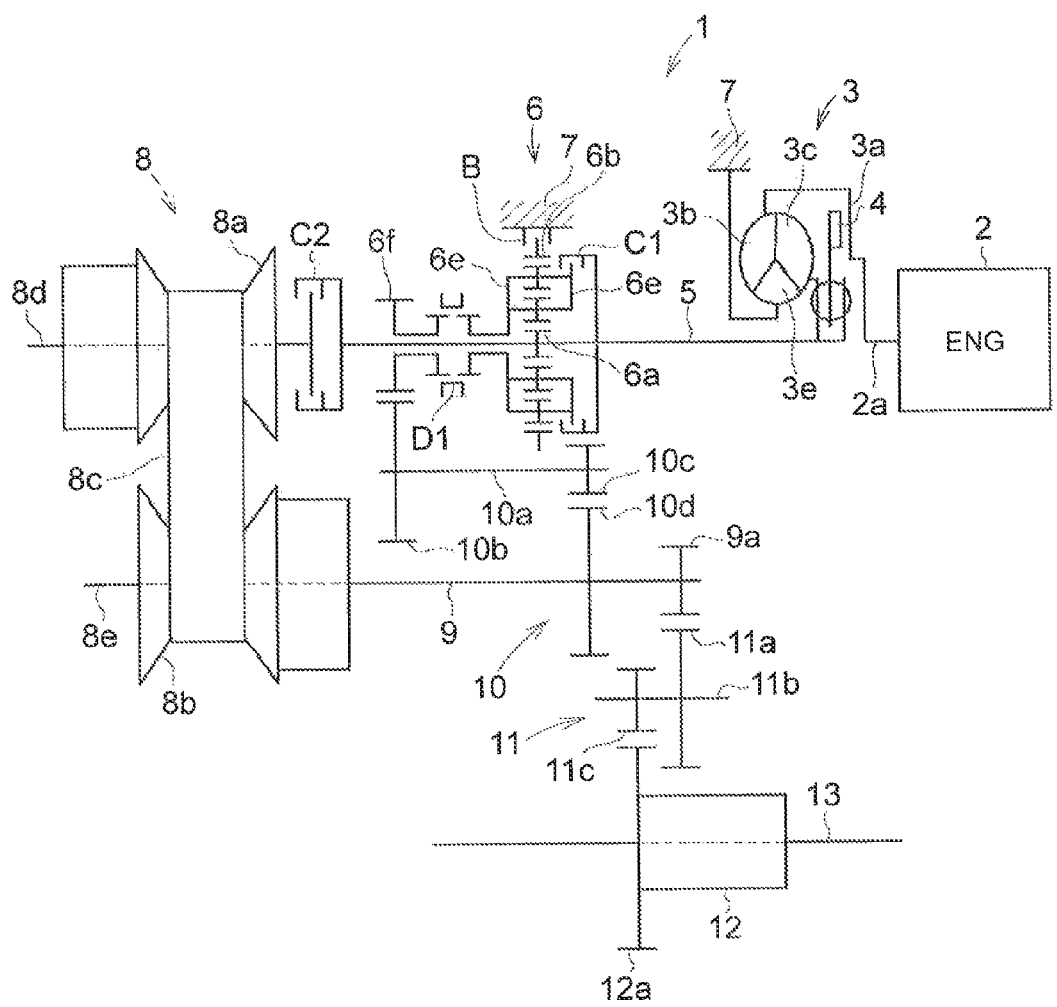
FIG. 9 is a skeletal view that shows another example of a powertrain in a transmission that may be employed as an object in the invention.

The example shown in FIG. 9 is an example in which, within the above-described configuration shown in FIG. 7, the second clutch mechanism C2 and the dog clutch D1 are arranged along the same axis as that of the input shaft 5 and the positions of the other members are changed accordingly. Thus, the dog clutch D1 is arranged in series with the first clutch mechanism C1 on a downstream side in the torque transmission direction, and is an engagement mechanism that allows the gear train 10 to transmit torque between the input shaft 5 and the output shaft 9 by selectively coupling the drive gear 6f and the carrier 6e, which are part of the gear train 10. The second clutch mechanism C2 is arranged between the input shaft 5 and the primary pulley 8a, and is configured to selectively couple these input shaft 5 and primary pulley 8a. Accordingly, the output shaft 9 is coupled to the secondary pulley 8b so as to integrally rotate with the secondary pulley 8b. The remaining configuration is similar to the configuration shown in FIG. 7.

Figure 10:
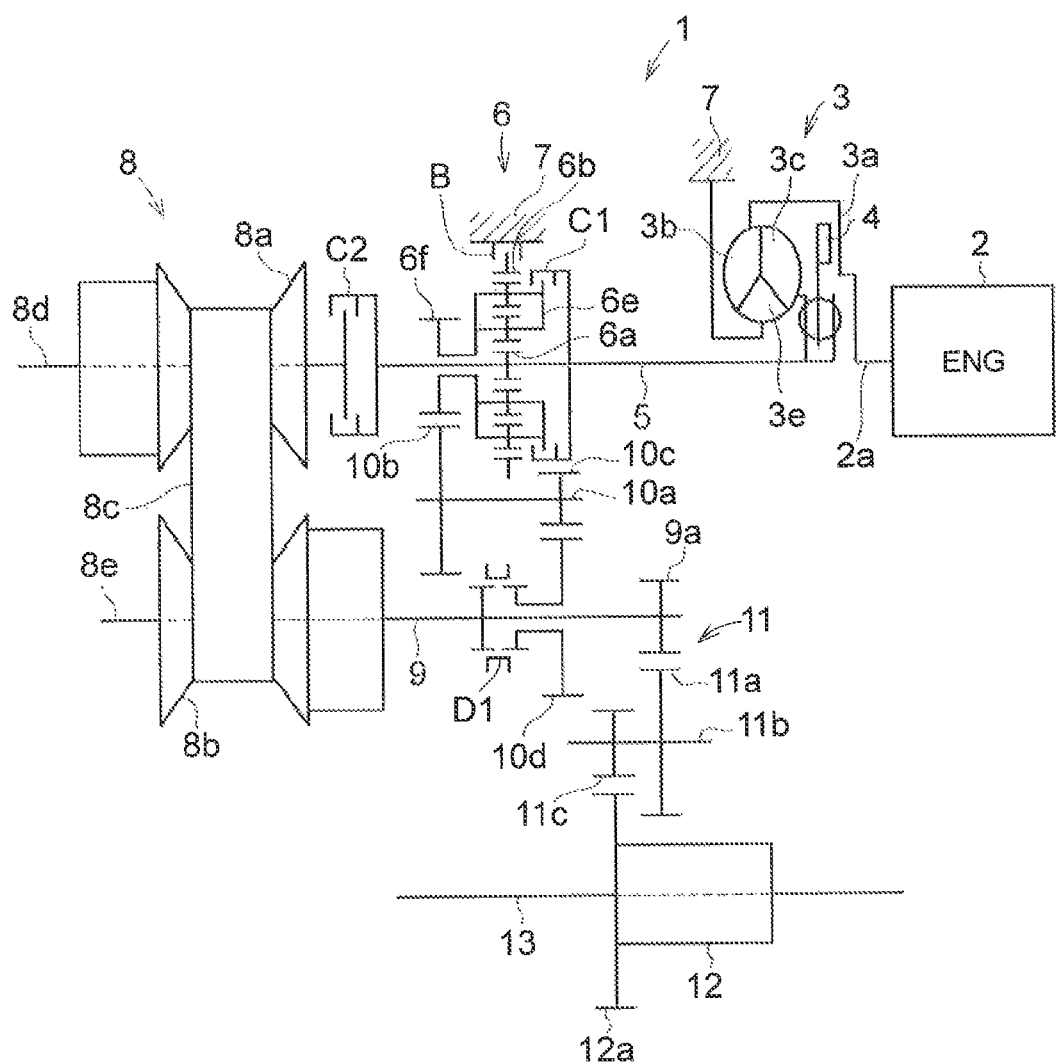
FIG. 10 is a skeletal view that shows further another example of a powertrain in a transmission that may be employed as an object in the invention.

The example shown in FIG. 10 is an example in which, within the above-described configuration shown in FIG. 7, the second clutch mechanism C2 is arranged along the same axis as the axis of the input shaft 5, the second clutch mechanism C2 is configured to selectively couple the input shaft 5 to the primary pulley 8a, and the positions of the other members are changed accordingly. The second clutch mechanism C2 is arranged along the axis as the axis of the input shaft 5, with the result that the output shaft 9 is coupled to the secondary pulley 8b so as to integrally rotate. The remaining configuration is similar to the configuration shown in FIG. 7.

Figure 11:
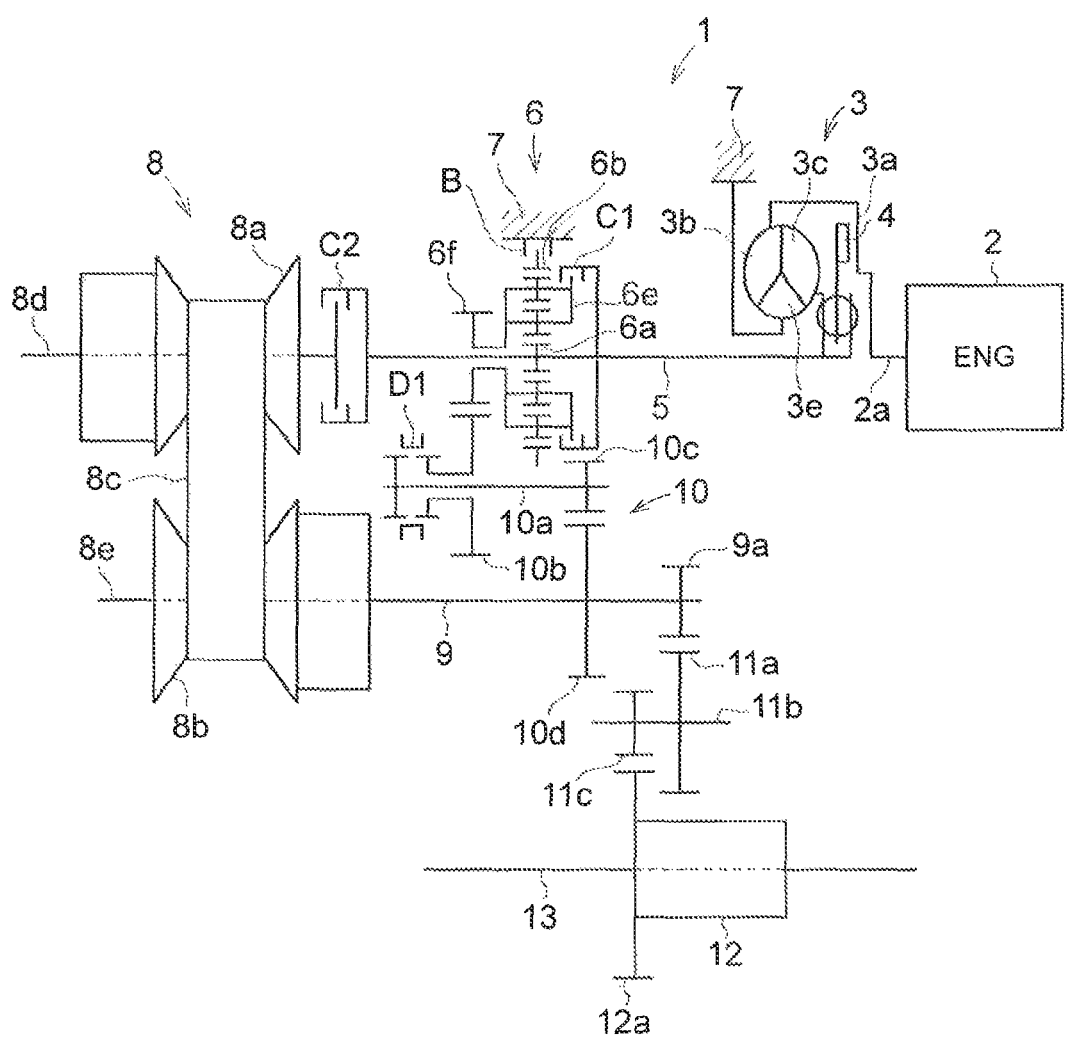
FIG. 11 is a skeletal view that shows yet another example of a powertrain in a transmission that may be employed as an object in the invention.

The example shown in FIG. 11 is an example in which, within the above-described configuration shown in FIG. 7, the dog clutch D1 is arranged on the counter shaft 10a, the second clutch mechanism C2 is arranged along the same axis as the axis of the input shaft 5, and the positions of the other members are changed accordingly. Thus, the dog clutch D1 is configured to selectively couple the counter driven gear 10b to the counter shaft 10a. The second clutch mechanism C2 is configured to selectively couple the input shaft 5 to the primary pulley 8a. The remaining configuration is similar to the configuration shown in FIG. 7.

Figure 12:
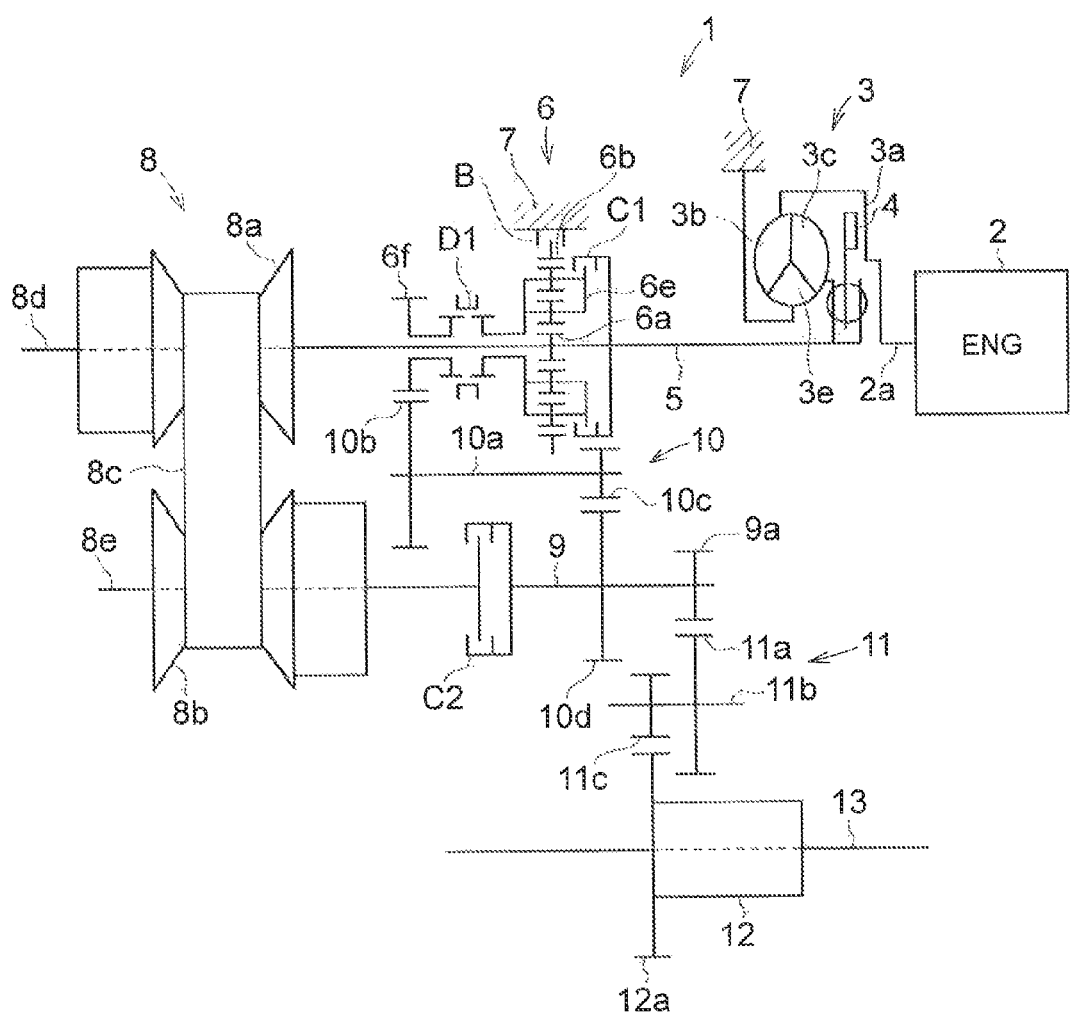
FIG. 12 is a skeletal view that shows further another example of a powertrain in a transmission that may be employed as an object in the invention.

The example shown in FIG. 12 is an example in which, within the above-described configuration shown in FIG. 7, the dog clutch D1 is arranged along the same axis as the axis of the input shaft 5, the dog clutch D1 is configured to selectively couple the input shaft 5 to the drive gear 6f, and the positions of the other members are changed accordingly. The remaining configuration is similar to the configuration shown in FIG. 7.

Figure 13:
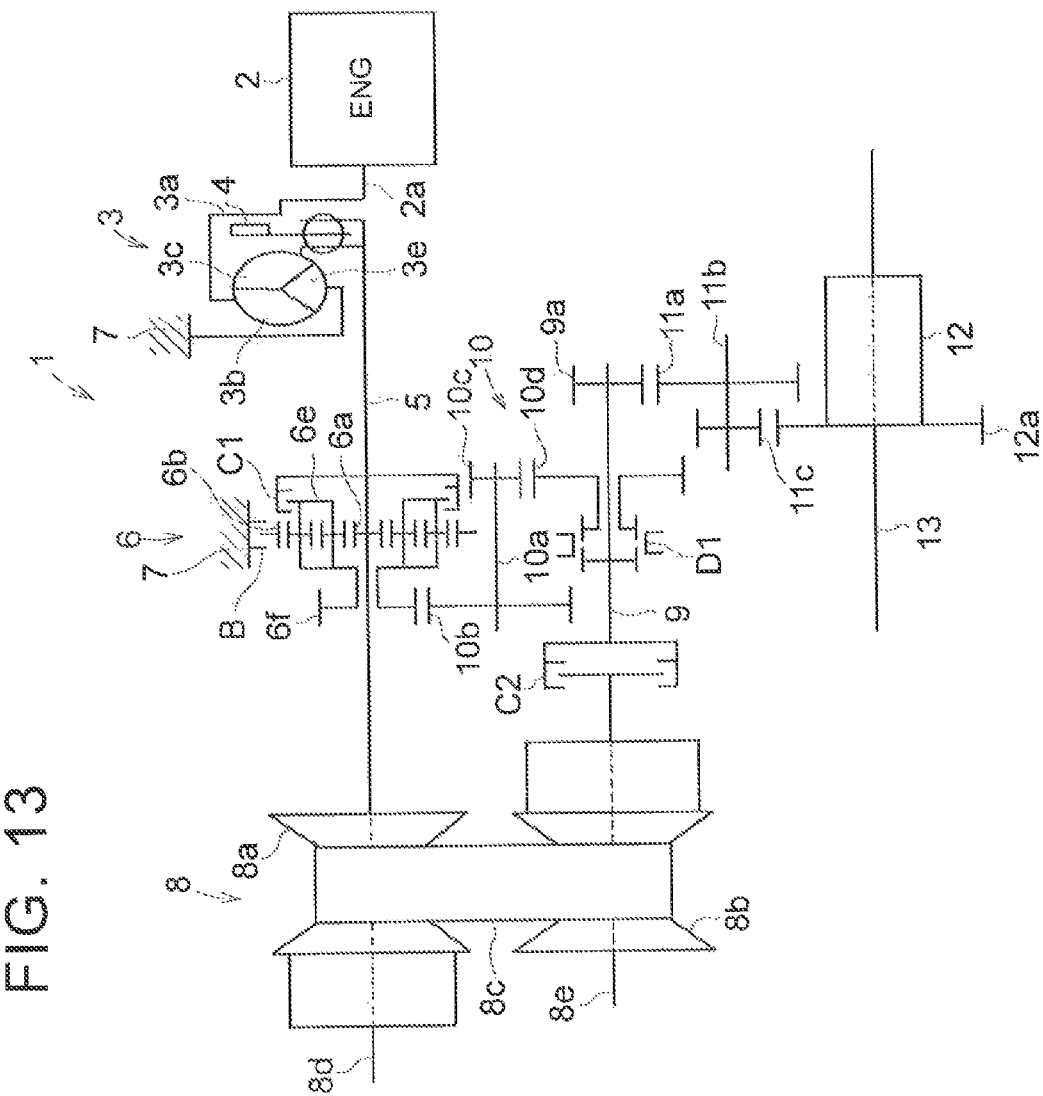
FIG. 13 is a skeletal view that shows further another example of a powertrain in a transmission that may be employed as an object in the invention.

The example shown in FIG. 13 is an example in which, within the above-described configuration shown in FIG. 7, the position of the first clutch mechanism C1 and the position of the drive gear 6f are interchanged along the axis of the input shaft 5, the position of the counter driven gear 10b and the position of the counter drive gear 10c are interchanged along the counter shaft 10a accordingly, and the positions of the other members are changed accordingly. The remaining configuration is similar to the configuration shown in FIG. 7.

Figure 14:
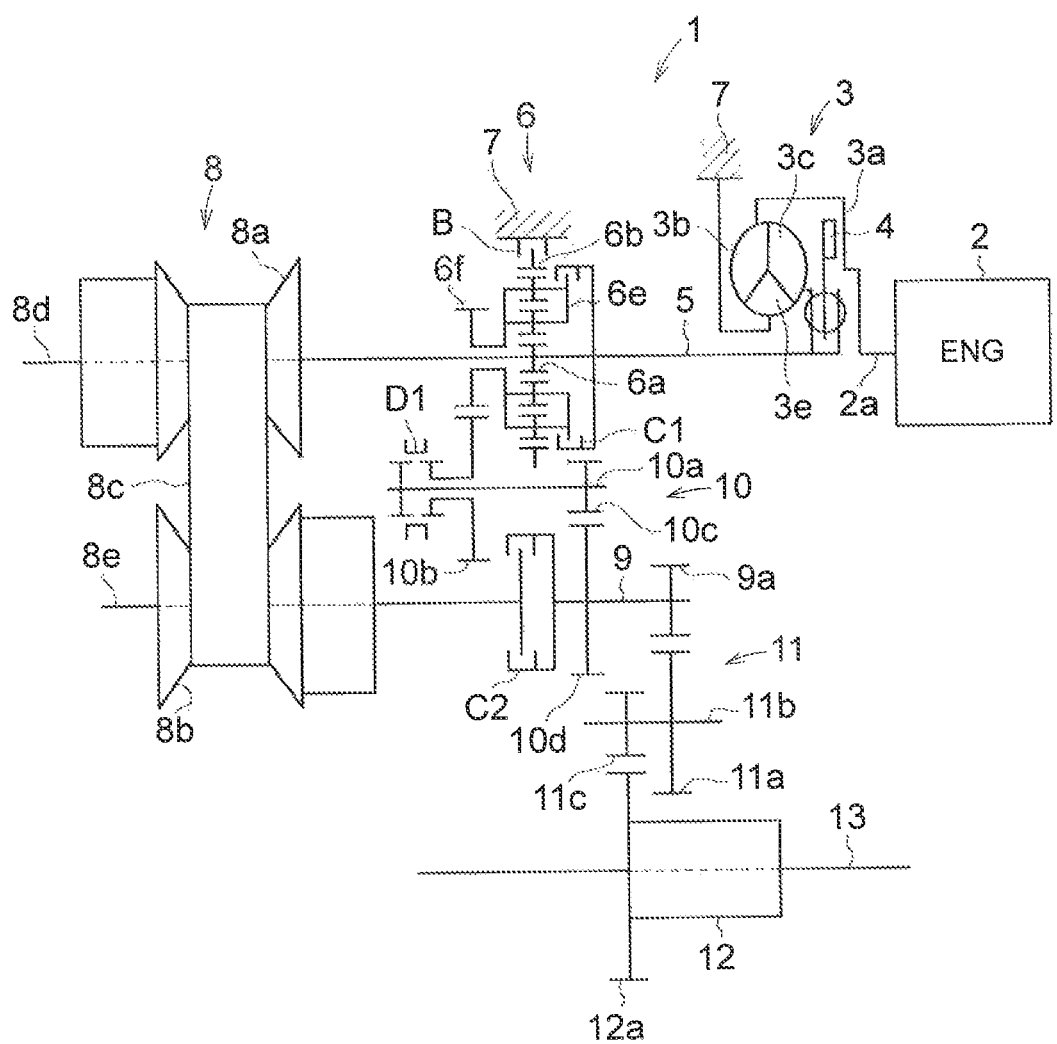
FIG. 14 is a skeletal view that shows further another example of a powertrain in a transmission that may be employed as an object in the invention.

The example shown in FIG. 14 is an example in which, within the above-described configuration shown in FIG. 7, the dog clutch D1 is arranged on the counter shaft 10a and the positions of the other members are changed accordingly. Thus, the dog clutch D1 is configured to selectively couple the counter driven gear 10b to the counter shaft 10a. The remaining configuration is similar to the configuration shown in FIG. 7.

Figure 15:
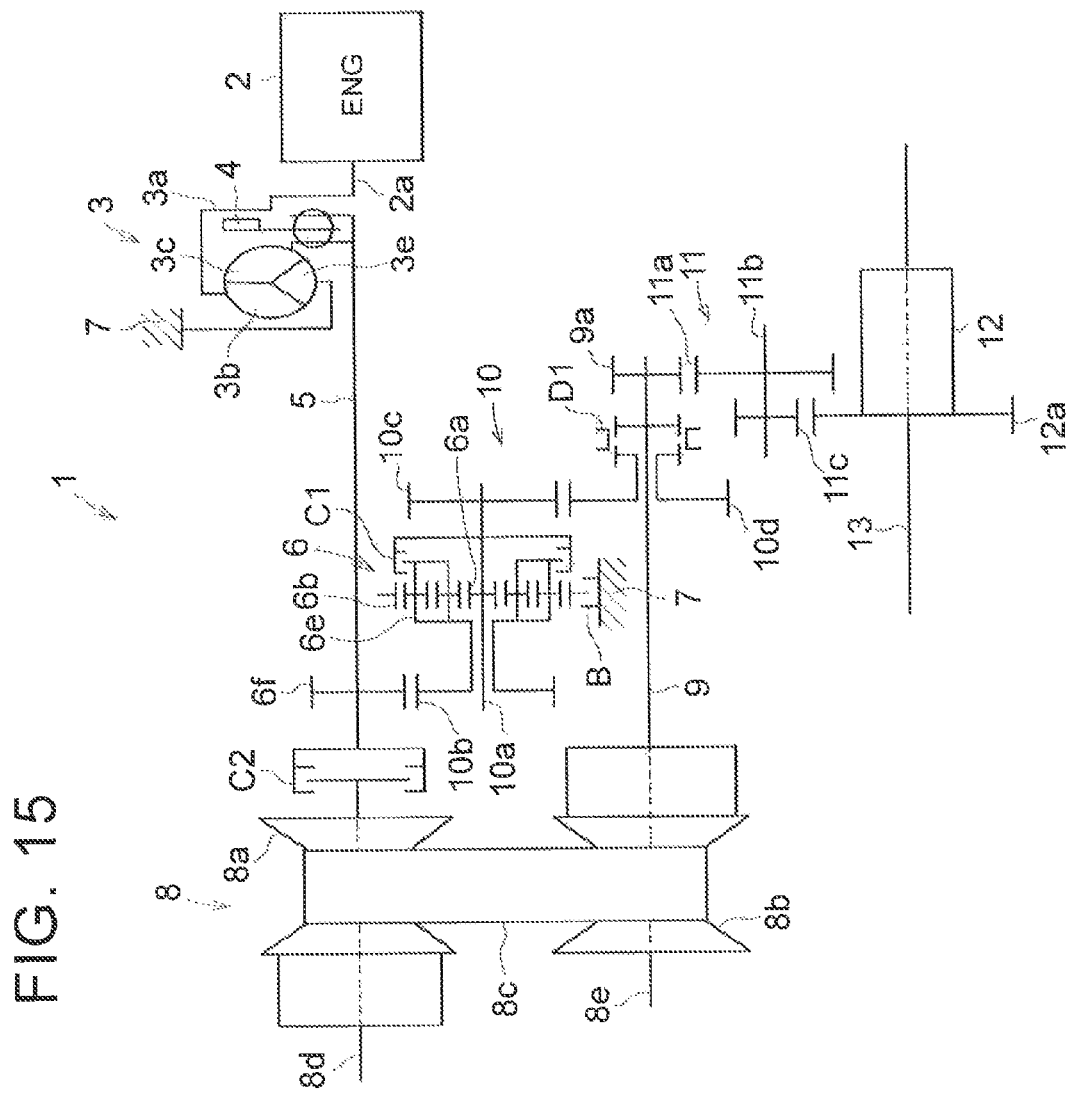
FIG. 15 is a skeletal view that shows further another example of a powertrain in a transmission that may be employed as an object in the invention.

The example shown in FIG. 15 is an example in which, within the above-described configuration shown in FIG. 7, the forward/reverse switching mechanism 6 and the first clutch mechanism C1 are arranged on the counter shaft 10a, the second clutch mechanism C2 is arranged along the same axis as the axis of the input shaft 5, and the positions of the other members are changed accordingly. Thus, the sun gear 6a of the forward/reverse switching mechanism 6 is integrated with the counter shaft 10a, the carrier 6e is coupled to the counter driven gear 10b, and the first clutch mechanism C1 is configured to selectively couple the carrier 6e to the counter shaft 10a. With this configuration as well, the first clutch mechanism C1 transmits the torque of the input shaft 5 to the gear train 10, the dog clutch D1 is arranged in series with the first clutch mechanism C1 on a downstream side of the first clutch mechanism C1, and is configured to transmit torque to the output shaft 9. The drive gear 6f is integrated with the input shaft 5, and the second clutch mechanism C2 is configured to selectively couple the input shaft 5 to the primary pulley 8a. The remaining configuration is similar to the configuration shown in FIG. 7.

Figure 16:
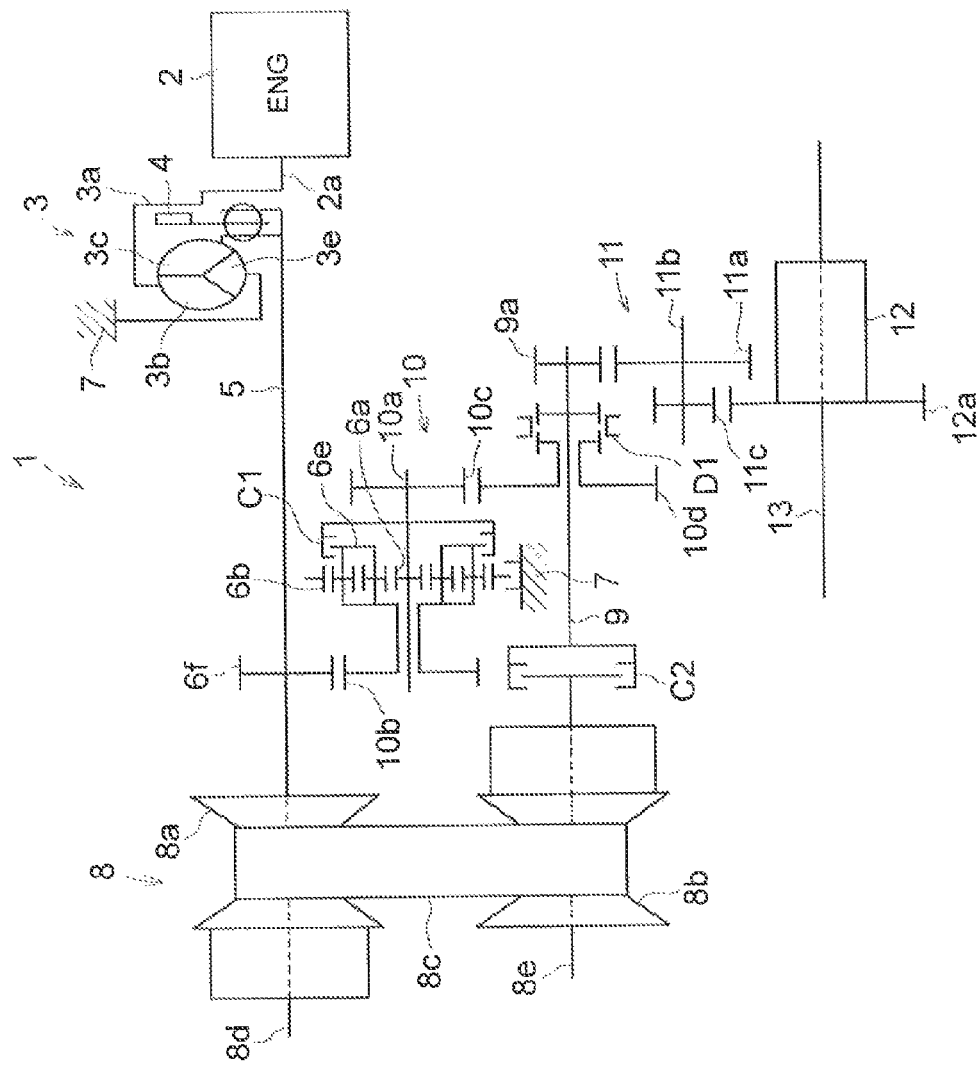
FIG. 16 is a skeletal view that shows further another example of a powertrain in a transmission that may be employed as an object in the invention.

The example shown in FIG. 16 is an example in which, with the above-described configuration shown in FIG. 7, the forward/reverse switching mechanism 6 is arranged on the counter shaft 10a, the drive gear 6f is integrated with the input shaft 5 accordingly, and the positions of the other members are changed. Thus, the sun gear 6a of the forward/ reverse switching mechanism 6 is integrated with the counter shaft 10a, the carrier 6e is coupled to the counter driven gear 10b, and the first clutch mechanism C1 is configured to selectively couple the carrier 6e to the counter shaft 10a. With this configuration as well, the first clutch mechanism C1 transmits the torque of the input shaft 5 to the gear train 10, the dog clutch D1 is arranged in series with the first clutch mechanism C1 on a downstream side of the first clutch mechanism C1, and is configured to transmit torque to the output shaft 9. The remaining configuration is similar to the configuration shown in FIG. 7.

The controller according to the invention is able to reliably and smoothly engage the dog clutch D1 by avoiding or suppressing an uplock of the dog clutch D1 even with the transmission having any one of these configurations shown in FIG. 9 to FIG. 16.

The input member and the output member in the invention each may be a gear other than a rotary shaft, such as the above-described input shaft 5 and the output shaft 9. The continuously variable transmission mechanism is not limited to a belt type, and may be a toroidal type. In addition, the transmission mechanism in the invention is not limited to a gear transmission mechanism, and may be a chain transmission mechanism.

DESCRIPTION OF REFERENCE NUMERALS 1 transmission, 2 internal combustion engine (engine), 3 torque converter equipped with a lockup clutch, 5 input shaft, 6 forward/reverse switching mechanism, B brake mechanism, C1 first clutch mechanism, 8 continuously variable transmission mechanism (CVT), 8a primary pulley, 8b secondary pulley, 8c belt, 9 output shaft, C2 second clutch mechanism, 10 gear train, 10a counter shaft, 10b counter driven gear, 6f drive gear, 10c counter drive gear, 10d driven gear, D1 intermeshing engagement mechanism (dog clutch), 9a output gear, 14 electronic control unit (ECU), 15 shift device, 16 accelerator pedal

The invention claimed is:

1. A controller for a vehicle, the vehicle including:
    a continuously variable transmission mechanism, a transmission mechanism, the continuously variable transmission mechanism and the transmission mechanism being provided in parallel with each other between an input member to which torque is transmitted from a driving force source and an output member that outputs torque to a drive wheel,
    a friction engagement mechanism configured to transmit torque from the input member to the transmission mechanism, the friction engagement mechanism including a mechanism of which a torque capacity increases with a hydraulic pressure that is supplied to the mechanism,
    an intermeshing engagement mechanism arranged on a downstream side of the friction engagement mechanism in a direction in which torque is transmitted from the input member toward the output member, the intermeshing engagement mechanism being configured to set the transmission mechanism to a state where torque is transmitted between the input member and the output member, and
    a shift mechanism configured to select between a neutral state where torque output from the driving force source is not transmitted to the drive wheel and a drive state where a predetermined speed ratio is set,
    the controller comprising:
    an electronic control unit configured to:
    (a) in changing from a state where both the friction engagement mechanism and the intermeshing engagement mechanism are released and the transmission mechanism is not able to transmit torque to a state where the intermeshing engagement mechanism is engaged and the transmission mechanism transmits torque to the output member, start engaging the intermeshing engagement mechanism after a torque capacity of the friction engagement mechanism is increased to a torque capacity that rotates the transmission mechanism;
    (b) carry out an increase in the torque capacity of the friction engagement mechanism by increasing the torque capacity of the friction engagement mechanism for establishing the drive state as a result of selection of the drive state by the shift mechanism; and
    (c) set a hydraulic pressure for setting the torque capacity that rotates the transmission mechanism based on at least one of a rotation speed of the transmission mechanism or an oil temperature.

2. The controller according to claim 1, wherein
the driving force source includes an internal combustion engine that is cranked to start up, and
the electronic control unit is configured to, when the internal combustion engine is cranked to start up, execute control for changing from a state where both the friction engagement mechanism and the intermeshing engagement mechanism are released to a state where the intermeshing engagement mechanism is engaged and the transmission mechanism transmits torque to the output member.

3. The controller according to claim 1, wherein
the friction engagement mechanism includes a mechanism that includes a drive-side member and a driven-side member and that transmits torque in a state where these drive-side member and driven-side member are in sliding contact with each other, and
the torque capacity that rotates the transmission mechanism includes a torque capacity that is set by bringing the drive-side member and the driven-side member into sliding contact with each other.

4. The controller according to claim 1, wherein
the continuously variable transmission mechanism includes a belt continuously variable transmission mechanism on which a belt is wound and in which a winding radius of the belt continuously changes by changing the width of a groove, and
the transmission mechanism includes a gear mechanism having a speed ratio higher than a maximum speed ratio of the belt continuously variable transmission mechanism or a speed ratio lower than a minimum speed ratio of the belt continuously variable transmission mechanism.

5. The controller according to claim 1, wherein
the transmission mechanism includes a forward/reverse switching mechanism that is switched between a forward traveling state where, when torque is transmitted from the input member to the output member, the output member is caused to rotate in the same direction as the input member and a reverse traveling state where, when torque is transmitted from the input member to the output member, the output member is caused to rotate in a direction opposite to the input member.

6. The controller according to claim 1, wherein
a fluid transmission mechanism is provided between the driving force source and the input member.

7. A controller for a vehicle, the vehicle including:

a continuously variable transmission mechanism, a transmission mechanism, the continuously variable transmission mechanism and the transmission mechanism being provided in parallel with each other between an input member to which torque is transmitted from a driving force source and an output member that outputs torque to a drive wheel, a friction engagement mechanism configured to transmit torque from the input member to the transmission mechanism, an intermeshing engagement mechanism arranged on a downstream side of the friction engagement mechanism in a direction in which torque is transmitted from the input member toward the output member, the intermeshing engagement mechanism being configured to set the transmission mechanism to a state where torque is transmitted between the input member and the output member, and a shift mechanism configured to select between a neutral state where torque output from the driving force source is not transmitted to the drive wheel and a drive state where a predetermined speed ratio is set, the controller comprising:

an electronic control unit configured to:

(a) in changing from a state where both the friction engagement mechanism and the intermeshing engagement mechanism are released and the transmission mechanism is not able to transmit torque to a state where the intermeshing engagement mechanism is engaged and the transmission mechanism transmits torque to the output member, start engaging the intermeshing engagement mechanism after a torque capacity of the friction engagement mechanism is increased to a torque capacity that rotates the transmission mechanism;

(b) carry out an increase in the torque capacity of the friction engagement mechanism by increasing the torque capacity of the friction engagement mechanism for establishing the drive state as a result of selection of the drive state by the shift mechanism; and (c) when engagement of the intermeshing engagement mechanism is not detected after control for engaging each of the friction engagement mechanism and the intermeshing engagement mechanism is started, execute control again for engaging the intermeshing engagement mechanism.

\* \* \* \* \*